US012542236B2

United States Patent
Masson et al.

(10) Patent No.: US 12,542,236 B2
(45) Date of Patent: Feb. 3, 2026

(54) METHOD FOR CONTINUOUS MANUFACTURING OF PERMANENT MAGNETS

(71) Applicant: Advanced Magnet Lab, Inc., Melbourne, FL (US)

(72) Inventors: Philippe Masson, Rockledge, FL (US); Mark Senti, Malabar, FL (US)

(73) Assignee: Advanced Magnet Lab, Inc., Melbourne, FL (US)

( * ) Notice: Subject to any disclaimer, the term of this patent is extended or adjusted under 35 U.S.C. 154(b) by 30 days.

(21) Appl. No.: 17/981,398

(22) Filed: Nov. 5, 2022

(65) Prior Publication Data

US 2023/0062147 A1 Mar. 2, 2023

Related U.S. Application Data

(63) Continuation of application No. PCT/US2021/030980, filed on May 5, 2021, and a (Continued)

(51) Int. Cl.
*H01F 41/02* (2006.01)
*H01F 1/032* (2006.01)
(Continued)

(52) U.S. Cl.
CPC ......... *H01F 41/0266* (2013.01); *H01F 1/032* (2013.01); *H01F 7/021* (2013.01);
(Continued)

(58) Field of Classification Search
CPC ...... H01F 41/0266; H01F 1/032; H01F 7/021; H01F 13/003; H01F 1/086;
(Continued)

(56) References Cited

U.S. PATENT DOCUMENTS 3,256,591 A * 6/1966 Muller .................... H01F 1/113 29/608
2002/0153061 A1 10/2002 Harada et al.
(Continued)

FOREIGN PATENT DOCUMENTS

EP 2477312 A1 7/2012
WO 2002101103 A2 12/2002

OTHER PUBLICATIONS

PCT/US2021/030980 International Search Report, Dec. 12, 2021, Form PCT/ISA/210.
(Continued)

*Primary Examiner* — Mohamad A Musleh
(74) *Attorney, Agent, or Firm* — Lowndes; Stephen C. Thomas

(57) ABSTRACT

A method for continuous manufacture of permanent magnets. A material sheet is formed into an open tube, having a lengthwise opening. Magnetic powder may be poured into the lengthwise opening on a continuous basis. The tube opening is then formed closed and sealed. The magnetic powder is magnetically pre-aligned by subjecting it to a first magnetic field. The tube containing the powder may be compressed into a desired shape, forming an elongated permanent magnet. After compression, the elongated magnet is magnetized by a second magnetic field in two-step process, wherein the elongated permanent magnet is subjected to a magnetic field from first magnetizing coil that is pulsed with a first electric current in a first direction, followed by a second magnetizing coil being pulsed with a second magnetizing electric current in a second direction. The elongated magnet may be formed into any arbitrary shape, such as a ring or coil.

40 Claims, 26 Drawing Sheets

Related U.S. Application Data continuation-in-part of application No. PCT/US2022/012622, filed on Jan. 14, 2022.

(60) Provisional application No. 63/020,039, filed on May 5, 2020, provisional application No. 63/137,363, filed on Jan. 14, 2021.

(51) Int. Cl.

| | |
|---|---|
| ***H01F 7/02*** | (2006.01) |
| ***H01F 13/00*** | (2006.01) |
| ***H02K 1/02*** | (2006.01) |
| ***H02K 1/278*** | (2022.01) |

(52) U.S. Cl.

CPC ............. *H01F 13/003* (2013.01); *H02K 1/02* (2013.01); *H02K 1/278* (2013.01)

(58) Field of Classification Search

CPC ..... H01F 41/0273; H01F 41/028; H02K 1/02; H02K 1/278; B22F 3/18; B22F 3/02; B22F 3/1208; B22F 5/12; B22F 2005/004; B22F 2998/10; B22F 2999/00; B22F 5/106; B22F 3/004; C22C 1/0441; C22C 2202/02

See application file for complete search history.

(56) References Cited

U.S. PATENT DOCUMENTS

| | | | |
|---|---|---|---|
| 2004/0245321 | A1 | 12/2004 | Spitz |
| 2010/0277027 | A1 | 11/2010 | Kaiser et al. |
| 2012/0217834 | A1 | 8/2012 | Lutz et al. |
| 2013/0093121 | A1 | 4/2013 | Honkura et al. |
| 2016/0065016 | A1 | 3/2016 | Seufert et al. |
| 2016/0294229 | A1 | 10/2016 | Volkmuth et al. |
| 2017/0098971 | A1 | 4/2017 | Kobayashi et al. |
| 2017/0187258 | A1 | 6/2017 | Fujikawa et al. |
| 2019/0027984 | A1 | 1/2019 | Bott et al. |
| 2019/0122818 | A1 | 4/2019 | Mienke |

OTHER PUBLICATIONS

PCT/US2021/030980 Written Opinion, Dec. 12, 2021, Form PCT/ISA/237.

PCT/US22/12622 International Search Report (May 2, 2022, Form PCT/ISA/210) and Written Opinion (May 5, 2022, PCT/ISA/237).

European Search Report on Application No. 22740191.6 - 1002 / 4278427, 2025-01-30.

* cited by examiner (S122)

(PULSE 1)

(PULSE 2)

RESULTING MAGNETIZATION

METHOD FOR CONTINUOUS MANUFACTURING OF PERMANENT MAGNETS

CROSS REFERENCE TO RELATED APPLICATIONS AND INCORPORATION BY REFERENCE

This non-provisional patent application is continuation of International Application No. PCT/US21/30980, entitled "METHOD FOR CONTINUOUS MANUFACTURING OF PERMANENT MAGNETS", filed in the United States Receiving Office (USRO) of the United States Patent and Trademark Office (USPTO) on May 5, 2021, and which published as WIPO publication number WO/2021/226293 on Nov. 11, 2021, the disclosure of which is incorporated herein by reference in its entirety; PCT/US21/30980 is a non-provisional of, and claims benefit of priority to, U.S. provisional patent application No. 63/020,039, entitled METHOD FOR CONTINUOUS MANUFACTURING OF PERMANENT MAGNETS, filed in the United States Patent and Trademark Office (USPTO) on May 5, 2020, the disclosure of which is incorporated herein by reference in its entirety; PCT/US21/30980 is also a non-provisional of, and claims benefit of priority to, U.S. provisional patent application No. 63/137,363 entitled PERMANENT MAGNETS HAVING CURVILINEAR SHAPES WITH AXIAL MAGNETIZATION, filed in the United States Patent and Trademark Office (USPTO) on Jan. 14, 2021, the disclosure of which is incorporated herein by reference in its entirety; this application is also a continuation in part of International Application No. PCT/US22/12622 entitled "ELECTRICAL MACHINES USING AXIALLY-MAGNETIZED CURVILINEAR PERMANENT MAGNETS", filed in the United States Receiving Office (USRO) of the United States Patent and Trademark Office (USPTO) on Jan. 14, 2022, which published as WO/2022/155535 on Jul. 21, 2022, the disclosure of which is incorporated herein by reference in its entirety; PCT/US22/12622 is non-provisional of, and claims benefit of priority to U.S. provisional patent application No. 63/137,363 entitled PERMANENT MAGNETS HAVING CURVILINEAR SHAPES WITH AXIAL MAGNETIZATION, filed in the United States Patent and Trademark Office (USPTO) on Jan. 14, 2021, the disclosure of which is incorporated herein by reference in its entirety; PCT/US22/12622 is also a continuation in part of International Application No. PCT/US21/30980, entitled "METHOD FOR CONTINUOUS MANUFACTURING OF PERMANENT MAGNETS", filed in the United States Receiving Office (USRO) of the United States Patent and Trademark Office (USPTO) on May 5, 2021, and which published as WIPO publication number WO/2021/226293 on Nov. 11, 2021, the disclosure of which is incorporated herein by reference in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The field of the invention relates generally to systems and methods for manufacturing of permanent magnets, including manufacturing, shaping and magnetizing such permanent magnets.

2. Background Art

As the volume of applications for electric machines (for example, electric motors and generators) continues to grow, the need for more powerful, efficient, and compact electrical machines continues to grow as well. Electrical machines depend upon magnets for their operation. Smaller, lighter, and more powerful magnets enable smaller, lighter, and more powerful electric machines.

Historically, the permanent magnets used in the production of electrical machines comprise anisotropic or sintered anisotropic magnetic materials that are molded or otherwise shaped by using chemical bonding agents, such as epoxy, to bind the magnetic particles together. The chemical bonding agents used to manufacture such prior art permanent magnets take up volume within the magnet structure, with the result that these prior art magnets are characterized as having a lower magnetic material density than would be achievable if the chemical bonding agents were not present. However, the chemical bonding agents bind the magnetic material together. Thus the magnetic material density of prior art magnets has been limited by the use of the chemical bonding agents that allow the prior art permanent magnets to hold their shape and to be machined or molded into a desired shape.

Further, the magnets of the prior art, including anisotropic sintered magnets, have been limited in size by the fact that in order to magnetize them, they must be subjected to a magnetizing magnetic field. Typically, this has been achieved by inserting the prior art permanent magnets into a magnetizing coil. Thus, the size of prior art magnets has therefore been limited by the size of the coils of the electromagnets used to magnetize them. As the magnetizing coils get larger, there comes a point where it is no longer feasible to construct the larger coils required to magnetize large permanent magnets of the prior art.

Thus, prior art permanent magnets are limited in their overall size. For example, it has not historically been possible to produce elongate permanent magnets, ring-shaped permanent magnets, coil-shaped permanent magnets or other-shaped permanent magnets characterized by high field strength, of sufficient dimension to create permanent magnets for use in applications such as, but not limited to, electrical machines of various types including motors and generators.

Because the overall size of permanent magnets of the prior art are limited in size, it may take a large under, sometimes dozens or even hundreds, of permanent magnet elements to assemble an electrical machine such as a motor or generator. Assembling this many individual permanent magnet elements together, each magnet being subject to magnetic forces generated by nearby permanent magnets, can be extremely problematic because it may be nearly impossible to hold each magnet in place against the large magnetic forces tending to move the magnet out of its designated place. Still further, many electric machines utilize magnet arrays that comprise closely spaced magnets, each having a different magnet field direction (or orientation) in order to simulate, for example, a sinusoidally varying magnetic field as required by the application (for example, an electric motor). These magnet arrays suffer from at least two significant problems: 1) they are very difficult and costly to assemble due to magnetic interaction between the various magnet array elements, and 2) at the boundaries between magnets, there is a discontinuity in the magnetic field that detracts from the quality of the resulting filed, which translates to loss of efficiency in the electric motor. This is because the discontinuities in the magnet field caused by to the use of discrete magnets cause the resultant magnetic field, which may be desired, for example, to be sinusoidal, to deviate from the ideal desired sinusoidal shape, thus causing a loss of power.

What is needed in the art, therefore, is an apparatus and/or method adapted to produce permanent magnets, characterized by precisely controlled magnetic field configuration and high field strength, of sufficient length to create ring or coil shaped permanent magnets for use in applications such as, but not limited to, electrical machines. If it were possible to produce elongate magnet geometries of sufficient length so as to enable forming magnets having ring, coil or other desired lengthwise shapes, while being able magnetize such magnets to produce a precisely controlled magnetic field in the permanent magnet, especially to create an precisely controlled continually varying magnetic field, such as a sinusoidally varying magnetic field with few or no discontinuities or deviation from the idea desired continuous magnetic field, greater electrical machine efficiencies would be realized, leading to smaller, more powerful machines, more efficient machines, and enable the use of magnetic materials having lower coercivity so that scare resources are not required to produce them.

BRIEF SUMMARY OF THE INVENTION

The present invention comprises an apparatus and method that have one or more of the following features and/or steps, which alone or in any combination may comprise patentable subject matter. The present invention overcomes the aforementioned shortcomings of the prior art by producing permanent magnets of sufficient length such that ring, coil and other desired lengthwise magnet shapes and geometries may be realized, and by providing a method for magnetizing the magnets produced by the method and system of the of the invention such that continually varying magnetic fields are produced by the magnets of the invention, having only minor, or no, discontinuities. Thus, magnets produced by the method and system of the invention are able to provide magnetic fields that are close to the ideal desired field characteristics, with few or no discontinuities. By using the permanent magnets of the invention in electrical machine production, the problems, cost and poor performance related to the use of numerous discrete magnets in electrical machine design are virtually or completely eliminated.

The method of the invention enables mass-produced, cost-effective permanent magnets having: elongated or "wire-like" shapes of any desired cross-section such as, but not limited to, circular, square, rectangular, oval, pie-shaped or any other desires shape, of any length; any desired cross sectional shape; any desired lengthwise shape such, for example, straight, ring, coil and any other desired shape; and any direction and strength of magnetization including both directional and varying magnetization.

The method of the invention can be used to replace conventional segmented permanent magnet assemblies, which consist of dozens and sometimes hundreds of magnets, with a single-piece magnet assembly which has been magnetized to achieve a desired optimum magnetic field distribution, leading to optimum performance, for a targeted application. The magnets produced by the method, for example, present an improved solution over traditional Halbach arrays, which have heretofore rarely been used in practice due to their prohibitive cost to manufacture and the complexity to assemble into an end-use product. End-use product examples for permanent magnets produced by the method and system of the invention include: electrical machines such as, for example, electric motors and generators; magnetic bearings; magnetic gearboxes; levitation devices; magnetic resonance imaging (MRI) and nuclear magnetic imaging (NMR); and charged particle beam optics (as may be used, for example, in high energy physics applications and proton cancer therapy).

In embodiments, the methods and magnets of the invention may comprise any magnetic material in powder form, including metal alloys such as, but not limited to, Neodymium iron boron (NdFeB), Samarium cobalt (SmCo), Alnico, iron nitride, and ferrite magnets, and including any magnetic material that has anisotropic or isotropic characteristics, including anisotropic or isotropic magnetic powder. In embodiments, the anisotropic or isotropic magnetic powder may be sintered. In embodiments, the magnet material may comprise any low-coercivity magnetic material. Herein, where a method step or magnet material refers to anisotropic magnetic materials, such as magnetic powder, it is to be understood that the use of "anisotropic" is exemplary only, and that any such method step or magnet may comprise either anisotropic or isotropic magnetic materials, including but not limited to magnetic powder.

In an embodiment, elongate permanent magnets of a defined length and magnetization may be produced by providing a tube having any cross-sectional shape, filling the tube with magnetic powder material while subjecting to the magnetic powder material to a pre-aligning magnetic field, optionally applying mechanical stimulation to the tube while the tube is being filed with the magnetic powder material, sealing the tube ends, compressing the magnetic powder material in the tube by subjecting the tube to compressive forces, for example acting normal to the longitudinal axis of the tube, and compressing the magnetic powder material inside the tube, in embodiments to a point of maximum compressed density of up to eight percent (80%) magnetic powder material volume to tube interior volume. The resulting sealed tube containing the magnetic powder material, which has been compressed and which does not use a binding agent, is an elongated permanent magnet of greater magnetic material density than is achievable by prior art manufacturing magnet manufacturing.

In an embodiment, the method of the invention may begin by creating or providing a magnetic powder in which a fine magnetic powder material is created from of one or more magnetic metals, which may comprise metal alloys. The magnetic powder material may be produced by any known method, for example, milling, jet-milling or grinding, into a magnetic powder material which may comprise very fine particles. The magnetic powder material may then be placed (e.g., by pouring) into a tube. The tube may have an enclosed interior volume, and may comprise walls comprising or consisting of non-magnetic materials. The tube-filling process may be the filling of a defined length of tube, resulting in an elongate permanent magnet of defined length, or it may be continuous, resulting in an elongate permanent magnet of any length, which may be fed the elongate permanent magnet directly into a substage stage in which the elongate permanent magnet is shaped into a straight, ring, coil, curvilinear (arcuate) section, or other lengthwise form factor or shape.

The method of the invention comprises two approaches to filling the tube with magnetic powder material. In a first approach, a tube of defined length is filled with magnetic powder materials which is magnetically aligned using a pre-alignment magnetic field while the powder is motivated into the tube by, for example, gravity. In a second approach, a channel structure having a lengthwise opening is continuously formed form a flat sheet material, then the channel is continuously filled with magnetic powder materials that are magnetically aligned using a pre-alignment magnetic field while the powder is being motivated into the channel, all on a continuous basis. The channel is formed closed, create a seam that is sealed, all on continuous basis, resulting in a long elongate permanent magnet having a length that may be limited only by the length of available rolls of sheet material, or hopper size for holding the magnetic powder material. In some situation such as the construction of infrastructure, facilities, large vessels and the like, permanent magnets of the invention may be produced on site such that the are not subject to any size limitations imposed by shipping or transportation. Thus, in the case of an aircraft carrier, for example, magnets of up to multiple hundreds of feet maybe produced using the method and system of the invention using the second, or "continuous" approach.

In an embodiment in which a magnet of discrete length is desired (the first approach mentioned above) a tube of desired and defined length and cross section is filled with magnetic powder material in the presence of a pre-aligning magnetic field. In embodiment, the field characteristics of the applied pre-aligning magnetic field (e.g. field orientation) may be similar or identical to the final desired magnetic field characteristics. The filled, magnetically pre-aligned tube may then be sealed on either end and process through one or more compressing and size-reducing steps in which the tube is forced through rollers having a shaped opening that is smaller than an exterior dimension of the tube. The tube experiences a reduction in cross sectional area, compressing the magnetic powder material filling the interior volume of the tube. This compression and tube size reduction step is repeated until a desired cross-sectional shape and size of the tube is reached. The resulting compressed, filled tube is then subjected to final lengthwise forming such as forming into any desired lengthwise shape, e.g. ring, coil, arcuate or other shape, using any known manufacturing process or technique such as, for example and not by way of limitation, a ring-roll process in which an elongate permanent magnet is worked into an arcuate or circular (i.e. ring) shape between rotating rollers that apply a bending force to the elongate permanent magnet as it is passed between the rollers, and then magnetized in a final magnetization step. Magnets up to length 2 meters or longer may be produced by this method. The manufacturing processes may be cold-working or hot-working processes, depending on the material composition, thickness, brittleness, and other characteristics of the tube 001, and depending on the degree of deformation of the tube required to reach a final desired lengthwise magnet shape.

In an embodiment in which the tube is filled with magnetic powder material on a continuous basis (the second approach mentioned above), a sheet of material, which may be non-magnetic, may first be fed, at a feed rate, into a forming machine such as one that utilizes rollers in which the flat sheet is formed into a channel shape having a lengthwise opening. The resulting channel, still traveling at the feed rate, may then be fed into a filling apparatus in which magnetic powder material is placed (e.g. by pouring, using gravitational force) into the channel. The channel, still traveling at the feed rate, may then be fed in to a machine in which the channel is formed into a closed cross-sectional tube shape, resulting in a lengthwise seam in the channel running along the length of the channel, which is then sealed by any means known in the art, such as, for example, welding. The tube shape may be any cross-sectional shape such as, but not limited to, circular, square, rectangular, pie-shaped, or any cross-sectional shape. A pre-aligning magnetic field may be applied to the channel while the channel is being filed with the magnetic powder material in order to provide an initial magnetic desired alignment of the magnetic powder particles. Mechanical stimulation such as vibration or impulses (shock) may be applied to the channel or tube, or both, during one or any of these steps, in order to compact the magnetic powder material into a higher density (i.e. tighter packing with less interstitial space, on average, between magnetic powder particles) within the resulting tube than is achievable by merely pouring the magnetic powder material into the channel. The resulting elongate permanent magnet, which has been pre-aligned, may then be cut to length and end caps attached to both ends of the tube in order to seal each and to prevent the intrusion of unwanted substances such as oxygen, which could have a corrosive effect on the magnetic powder material inside the tube. The tube may then be subjected to compressive forces, for example acting normal to the longitudinal axis of the tube, compressing the magnetic powder material inside the tube, in embodiments to a point of maximum compressed density of up to eight percent (80%) magnetic powder material volume to tube interior volume. The sealed tube may then be subjected to a continuous process of compressing and shaping the tube, either at the feed rate or as part of a separate following process. The elongated permanent magnet may be swage formed, i.e. compressed, in a continuous process comprising a series of one or more stages. The resulting elongate permanent magnet may be fed the directly into a subsequent forming stage in which the elongate permanent magnet is shaped into a ring, coil, arcuate section, or other lengthwise form factor or shape. Each stage may be carried out using rolling mills, Turks heads or other similar tooling. In embodiments, magnetic pre-alignment in a first magnetic field during the tube filling process, and final magnetic alignment at any stage after sealing of the tube, using one or more second magnetic fields, may be employed to achieve a final permanent magnet of desired cross sectional and lengthwise shape, and desired magnetization, is produced. Thus, a final permanent magnet with a desired cross-sectional shape, a desired lengthwise shape (such as straight, ring, coil, arcuate section or other lengthwise shape) and desired magnetization may be produced by the system and method of the invention. The resulting sealed tube containing the magnetic powder material, which has been compressed and which does not use a binding agent, is a permanent magnet characterized by greater magnetic material density that is achievable by prior art manufacturing magnet manufacturing. The tube becomes the elongated permanent magnet jacket which seals the elongated permanent magnet, provides structural integrity, eliminates the need for a binding agent which is wasteful of the magnet volume, provides a means for cooling the elongated permanent magnet and may provide a weldable material for assembly of the elongated permanent magnet into desired product assemblies for virtually countless applications. The continuous tube form, fill and seal process of the method of the invention may run at a continuous high rate of speed, for example, up to and surpassing twenty meters per second.

Once permanent magnets are produced by the method and system of the invention, whether by production of defined-length magnets or the production of permanent magnets by the continuous method of manufacture described herein, the resulting permanent magnets may be subjected to a final magnetization step to achieve a final, desired magnetization of the elongate permanent magnet.

In embodiments, the final, resulting magnetization of the elongate permanent magnet may be uniform or non-uniform and may include continuously changing magnetization direction providing an optimized desired magnetic flux direction.

Non-straight permanent magnet geometries such as, for example, straight, ring, coil, arcuate, or other geometries may be formed to shape after the tube is formed into its final desired cross-section. This method for forming the various lengthwise shapes such as, for example, straight, ring, coil, arcuate, or other geometries may be carried out using a ring forming or roll forming machine, which may be programmable to define feed rate and radius of curvature of the formed permanent magnet.

In embodiments, permanent magnets produced by the method of the invention may be, but are not necessarily, sintered in a separate step. Sintering requires a thermal treatment (heating followed by quenching) of the filled, compressed tube allowing the powder to form a solid continuous block within the tube. The sintering process parameters such as temperature, time, and quench temperature depend on the composition of the magnetic powder material. Final magnetization of the permanent magnet produced by the inventive method may be a separate and final process.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings, like callouts refer to like elements, and magnetic fields are indicated by magnetic field lines depicted as a series of arrows. In the drawings:

In FIG. 11B a first magnetic field is pulsed. In FIG. 11C, a second magnetic field is pulsed. The two pulsed fields magnetize the final permanent magnet with the desired field characteristic depicted in FIG. 11D which depicts an exemplary coil embodiment of a ring-shaped elongated permanent magnet produced by the method and system of the invention.

DETAILED DESCRIPTION OF THE INVENTION

Figure 1:
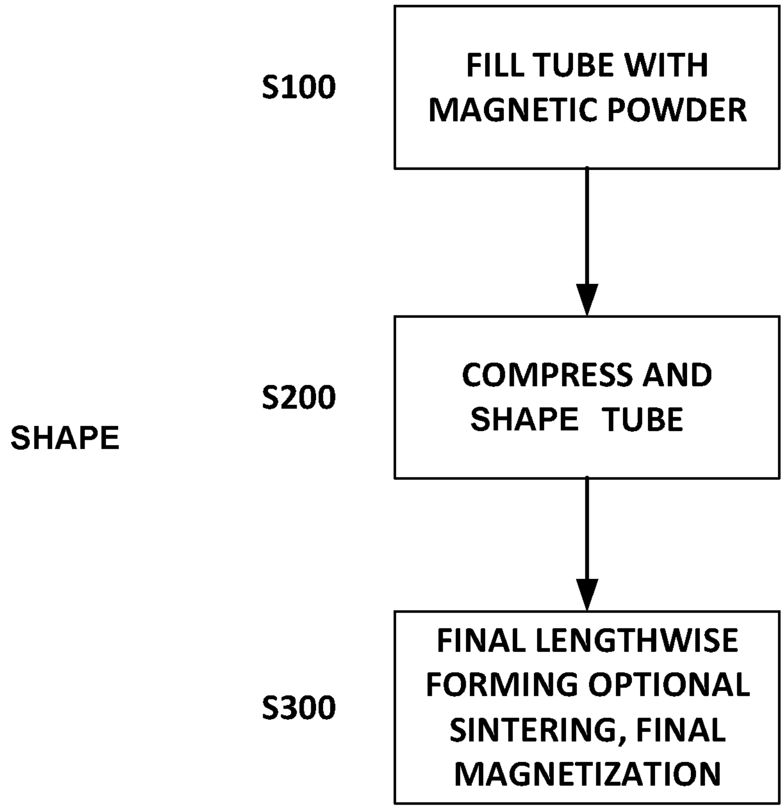
FIG. 1 is a flow chart depicting the basic steps of an embodiment of the invention, in which magnetic powder material is poured or placed into a tube, the tube is compressed, resulting in a reduction of cross-sectional area of the tube and compressing the magnetic powder material filling the tube, and the compressed tube is then formed to a final desired lengthwise form such as straight, curvilinear, ring, coil, or other geometry, and magnetized in one or more final magnetization steps.

The following documentation provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and their legal equivalents, and not merely by the preferred examples or embodiments given.

As used herein, "isotropic magnetic materials" includes within its meaning magnetic materials that have a net zero magnetic moment such that they do not experience a force when subjected to a magnetic field. During manufacture, a permanent magnet made of magnetically isotropic material has no preferred direction of magnetism and has the same magnetic properties along any axis. During manufacture, a magnet comprising isotropic materials can be magnetized to have a desired magnetization by applying a magnetizing magnetic field. When the magnetizing magnetic field is removed, the magnet maintains the desired magnetization. Magnets formed of isotropic magnetics materials contain bonding agents to hold the magnetic material together, allowing them to be molded and/or machined into a final desired shape, and then magnetized by subjecting them to a magnetizing magnetic field of desired characteristics. Because a bonding agent is required in the production of magnets formed of isotropic magnetic materials, the density of the isotropic magnetic material forming such magnets is lower than the density of the anisotropic magnetic materials filling the tube of the present invention. Thus magnets produced by the method and system of the invention provide stronger magnetic field that magnets of the prior art formed of isotropic magnetics materials.

As used herein, "anisotropic magnetic materials" includes within its meaning magnetic materials that nave a non-zero net magnetic moment such that they experience a force when subjected to a magnetic field. For certain materials this means that at least some of the atoms of such materials have unpaired electrons leading to a net magnetic field at the atomic level, including anisotropic magnetic materials.

As used herein, "magnetic materials" includes within its meaning any material or combination of materials forming a composition of materials, that, overall, exhibits their own persistent magnetic field either naturally or as the result of being subjected to a magnetizing magnetic field (i.e. "magnetized"). "Magnetic materials" may include within its meaning, but is not limited to, neodymium iron boron (NdFeB), samarium cobalt (SmCo), Alnico, ferrite, iron nitride, rare-earth materials, non-rare earth materials, materials of any coercivity including low-coercivity materials, or any other magnetic materials, in any combination or proportion, that exhibit, either alone or in combination, a desired level of field strength and/or coercivity.

As used herein, "sintering" includes within its meaning the process of compacting a material by the application of heat, without melting the material to the point of liquification.

As used herein, "magnet wire" means an elongated permanent magnet produced by the method and system of the invention.

As used herein, "continuous" or "continuous process" includes within their meanings processes that are operable without interruption for a period of time that is variable based on the availability of source materials supplying the process, as opposed to discrete processes, which operate on a given piece-part basis, and produce a discrete, defined output.

As used herein, "tube" includes within its meaning an elongate hollow structure having a closed cross section. The tube may be of any cross-sectional shape including circular (resulting in a cylindrical shaped tube), square, rectangular or any cross-sectional shape. The tube walls, or "jacket" may have a wall thickness WT (see FIG. 8). It is not necessary that all the tube walls be of uniform thickness, although, in embodiments, it may be desirable that all tube walls be of the same, or uniform, thickness. In any of the embodiments, the tube may comprise a non-magnetic material. In any of the embodiments, the tube may consist exclusively of a non-magnetic material. The tube wall material is typically non-magnetic and may, for example, comprise stainless steel, titanium, copper, composite materials. The tube walls material may be electrically conductive or non-conductive depending on the end-use application.

As used herein, "magnetic powder material" includes within its meaning a magnetic material that has been reduced to a granular (i.e. "powder") form by any process known in the art such as milling, jet milling or grinding. The particles of a magnetic powder material may be of non-uniform shape and size. When a tube of the invention is filled with magnetic powder material, interstitial spaces, or volumes, between particles of magnetic powder material are formed. Such interstitial spaces, or volumes, may be reduced in size by mechanical stimulation such as mechanical vibration or impulses (shock) applied to the tube, and by the compression steps of the method in which the outer dimensions filled tube are reduced, or the length of the filled tube is increased, as described herein. Magnetic powder materials may comprise magnetic powder from one or a plurality of magnetic materials. "Powder" as used herein includes within its meaning, but is not limited to, a range of size of particles between 2 microns to 60 microns or larger. For example, and not by way of limitation, sintered magnetic materials may be reduced to a magnetic powder material of between 2 microns and 6 microns in size, or greater. As another non-limiting example, non-sintered magnetic materials may be reduced to a magnetic powder material of between 15 microns and 60 microns in size, or greater.

As used herein, "anisotropic magnetic powder material" is magnetic powder material that comprises anisotropic magnetic materials. In embodiments, "anisotropic magnetic powder material" includes within its meaning magnetic powder material that contains only magnetic powder material that is anisotropic. In embodiments, if the anisotropic magnetic powder material comprises magnetic powder from one or a plurality of magnetic materials, each of type of magnetic material used to create the magnetic power material may be, but is not necessarily, anisotropic.

As used herein, "filling a tube" and "tube-filling" include within their meaning the act of filling the interior volume of a tube of the invention with magnetic powder material.

As used herein, "filled tube" includes within its meaning a tube, of any cross-sectional shape, whose interior volume has been filled with magnetic powder material.

As used herein, "lengthwise shape" and "lengthwise form" include within their meaning the geometric arrangement of the elongate axis of a permanent magnet. As an example, a "straight" lengthwise shape means a permanent magnet with an elongate shape that is linear. As another example, a "ring" lengthwise shape means a permanent magnet with an elongate shape that is circular and closes back on itself to form a closed circle. As another example, a "coil" lengthwise shape means a permanent magnet with an elongate shape that is helically shaped. The lengthwise shape of a permanent magnet of the invention does not necessarily have to have a shape of standard geometric definition, i.e., it may be any desired arbitrarily shaped geometric arrangement of the elongate axis of the permanent magnet, in two-dimensional or three-dimensional space. The lengthwise shapes shown and described herein are exemplary embodiments of permanent magnets produced by the method and system of the invention, and are not therefore intended to be limiting.

As used herein, "continually varying magnetic field" means a magnetic field in which the magnetic field direction continually varies along an axis of the tube of the invention, without discontinuity.

In the embodiments described herein the tube and channel shapes described have an axis Z as depicted in the figures. All tubes and channels, and the resulting permanent elongate magnets produced by the method of the invention, described herein may be characterized as having a longitudinal axis Z running along their length.

In embodiments, the invention comprises a method and system for manufacturing permanent magnets, including but not limited to elongate permanent magnets of various lengthwise form such as straight, curvilinear, arcuate, ring, coil, and other shapes; and the invention is also the magnets created by the method and system. More specifically, the method and system for manufacturing permanent magnets includes the steps of filling a tube with an anisotropic magnetic powder material to form an elongate permanent magnet while subjecting the anisotropic magnetic powder material to a pre-aligning magnetic field, compressing the elongate permanent magnet to reach a maximum density of an anisotropic magnetic material within the tube and reducing the cross-sectional area of the tube, lengthwise shaping and forming the elongated permanent magnet into a final desired lengthwise shape for the permanent magnet, and magnetizing the permanent magnet such that the resulting permanent magnet exhibits a desired magnetic field.

In embodiments, the permanent magnet may undergo a sintering step prior to the final magnetization step.

The lengthwise shaping and forming step and final magnetization step do not necessarily have to proceed in this order; they may occur in any order. In embodiments, each of the above steps may comprise one or more sub-steps as further described herein. In the various embodiments of the invention, the steps or sub-steps may be characterized differently, depending on the desired final shape and magnetic field characteristics of the resulting elongated permanent magnet.

Non-limiting examples of the types of elongate permanent magnets that are able to be produced by the method and system of the invention are:

1. elongate straight permanent magnets of defined length, having a transverse uniform magnetization in which the magnetic field direction is transverse to the elongate, or longitudinal, axis of the magnet;
2. elongate straight permanent magnets of defined length, having an axially-aligned magnetization in which the magnetic field direction is aligned with, or runs along, the elongate, or longitudinal, axis of the magnet;
3. elongate straight permanent magnets of defined length, having a continuously varying magnetization with respect to the elongate, or longitudinal, axis of the magnet;
4. curvilinear, including arcuate or arc-shaped, permanent magnets having any desired direction of magnetization including transverse, axial or continuously varying;
5. ring-shaped permanent magnets having any desired direction of magnetization including transverse, axial or continuously varying;
6. coil-shaped permanent magnets having any desired direction of magnetization including transverse, axial or continuously varying;
7. permanent magnets of any desired lengthwise shape having any desired direction of magnetization including transverse, axial or continuously varying.

While the basic process flow is the same for all the above elongate permanent magnet types, the various embodiments of the elongate permanent magnets produced by the method and system of the invention may be produced by embodiments of the method, as defined below.

Referring now to FIG. 1, a basic process flow of an embodiment of the method of the invention is depicted. In a first step S100 a tube, which may have any cross-sectional shape, is provided and filled with an anisotropic magnetic powder material. During step S100, a pre-aligning magnetic field may be applied to assist in achieving a more accurate final magnetization of a permanent magnet produced by the method of the invention. This pre-alignment magnetization may occur while the anisotropic magnetic powder material is filling the tube, literally while the anisotropic magnetic powder is falling into the tube and has the ability to be acted upon by forces generated by the applied pre-aligning magnetic field on the anisotropic magnetic powder material. This allows the anisotropic magnetic powder material to be pre-aligned with the final desired magnetization, such that the final magnetization is able be carried out with lower final magnetizing electromagnet current than in methods of the prior art.

Still referring to FIG. 1, in a second step S200, the filled tube is compressed, the compression, in embodiments, resulting in a desired tube cross sectional shape or size, or both, compacting and compressing the anisotropic magnetic powder material within the tube. The compression of the anisotropic magnetic powder material may be up to any compression desired ratio of magnetic powder material volume to interstitial volume. It has been empirically discovered through extensive experimentation that the anisotropic magnetic powder material volume to tube internal volume maximizes at about eighty percent (80%) for certain magnetic powder materials, meaning that, for such anisotropic magnetic powder materials, any further compression of the filled tube results in an extrusion of the tube material itself, elongating the tube along its elongate axis (see FIG. 7A). An advantage of the method of the invention is that it is not necessary to use binding material to hold the anisotropic magnetic powder materials particles together, such as is required with magnets and magnet-producing processes of the prior art. Thus, there is more volume available within the tube interior volume for anisotropic magnetic powder material, resulting in a higher density of anisotropic magnetic powder material in the magnets produced by the method of the invention than is available in the magnets of the prior art. Further, the anisotropic magnetic powder material within the tube is compressed in step S200, in embodiments achieving a maximum compression ration of up to 80%. This means that there is no internal volume lost to binding materials (such as adhesives and epoxy) and that volume lost to interstitial spacing between magnetic particles is minimized, leading to a higher magnetic density than is achievable with prior art methods of magnet manufacture. Thus, permanent magnets produced by the system and method of the invention are more powerful, i.e. exhibit a higher magnetic field strength, for a given magnet volume than magnets produced by manufacturing methods of the prior art.

Still referring to FIG. 1, in a third step S300, in embodiments, the elongate permanent magnet 100 may be formed into a final desired lengthwise shape, or geometry, and finally magnetized in a final magnetization step to achieve a final desired magnetization by subjecting it to one or more final magnetizing fields. The final magnetization may be carried out in one or more steps in which the permanent magnet is subjected to one or more magnetizing fields, which are not necessarily identical, but which may produce a desired resulting magnetic field that persists in the permanent magnet. The strength and direction of the resulting magnetic field may be tailored for specific applications of the permanent magnet. An exemplary ring-shaped permanent magnet produced by the method of the invention, which is pre-aligned to a continuously varying magnetization during step 100, and then is formed into a lengthwise ring shape 002 or 003 and finally magnetized using a two-step final magnetization process, is depicted in FIGS. 11B, 11C, an 11D.

Method for Producing Elongate Magnets of Defined Length

Figure 2:
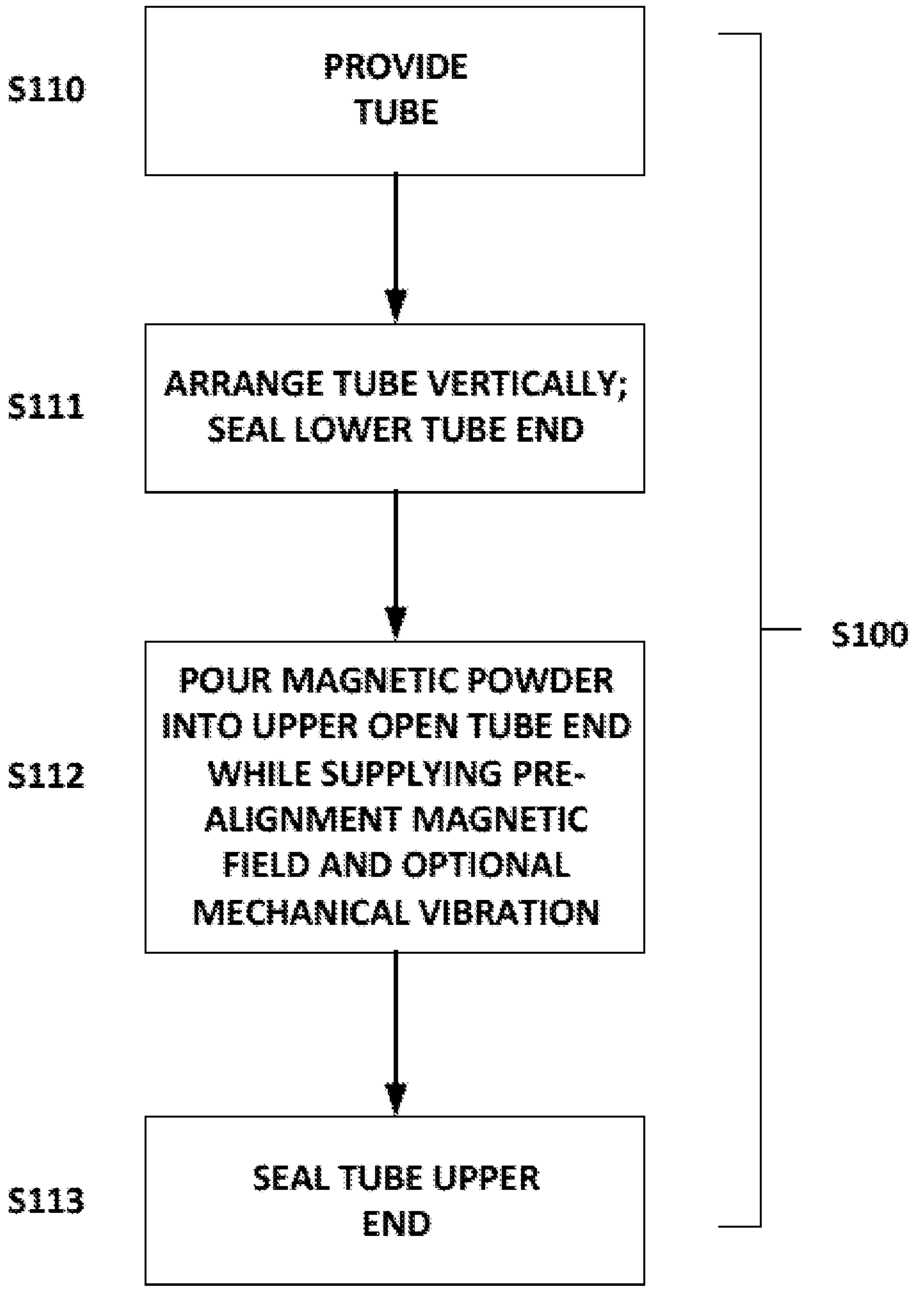
FIG. 2 is a flow chart depicting the sub-steps of an embodiment of step S100, the tube-filling step, for the case in which the tube is provided pre-formed in a tube shape of any cross section such as, for example, square, rectangular, circular or any other cross section. A pre-aligning magnetic field is applied to the magnetic powder material while it is filling the tube, and optional vibration may be applied to the tube during and after the pouring of the magnetic powder material into the tube. Using the process depicted in FIG. 2, elongated permanent magnets of a pre-defined length may be produced.

Referring now to FIG. 2, a basic process flow of an embodiment of the system of the invention is depicted in which step S100 (see FIG. 1) is further defined as producing an elongate permanent magnet of predefined length. In this case, in a first step S110, a tube is provided. The tube may be aligned such that its elongate, or longitudinal, axis is oriented vertically relative to the Earth's surface, so that Earth gravity will assist with the tube filling process by causing anisotropic magnetic powder material to fall into the tube, S111. The lower end of the tube may be sealed by any means known in the art such as welding or chemically bonding a cap to cover the lower open tube end, attaching and sealing around the periphery of the tube. In a next step S112, anisotropic magnetic powder material may be poured into, or placed into, the tube through the open upper tube end while it is subjected to a pre-aligning magnetic field. In embodiments, during the tube-filling process, mechanical shock or vibration may be applied in order to aid in the compacting of the anisotropic magnetic powder material in the interior volume of the tube. Once the tube has been filled with anisotropic magnetic powder material, the upper end may be sealed like manner to the lower end, S113. The steps of filling, pre-aligning, optional vibrating, and tube sealing may be carried out in an oxygen-free environment, such as within a chamber from which oxygen has been purged such as by an applied vacuum or nitrogen fill.

Method for Producing Elongate Magnets by Continuous Process

Figure 3:
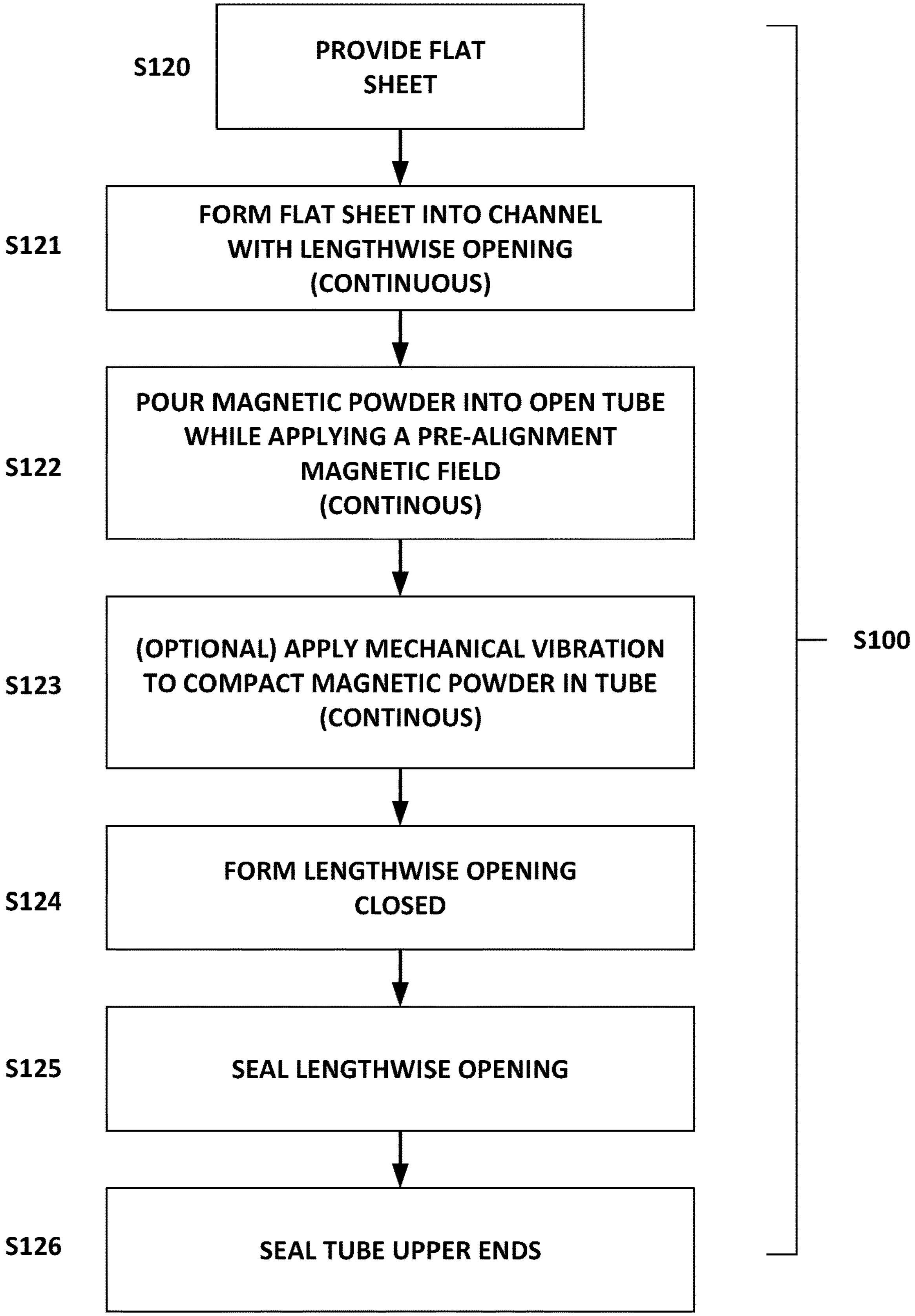
FIG. 3 is a flow chart depicting the sub-steps of a further embodiment of step S100, the tube-filling step, for an embodiment in which the tube is manufactured in a continuous manufacturing process. A pre-aligning magnetic field is applied to the magnetic powder material while it is filling the tube, and optional vibration may be applied to the tube during and after the pouring of the magnetic powder material into the tube. Using the process depicted in FIG. 3, elongated permanent magnets of any length may be continuously produced.

Referring now to FIG. 3, a basic process flow of an embodiment of the method of the invention is depicted in which step S100 (see FIG. 1) is further defined as being a continuous process, producing an elongate permanent magnet of any length. In a first step a flat material sheet of preferably non-magnetic material is provided S120. The sheet material is fed lengthwise into forming rollers to form the sheet into a channel cross section S121 running lengthwise along the elongate axis of the desired permanent magnet, the channel having an opening running lengthwise, and preferably oriented upwards, and the channel having an elongate channel axis that is coaxial with the elongate axis of the desired permanent magnet. Anisotropic magnetic powder material is placed into the open channel through the lengthwise opening S122. While the anisotropic magnetic powder material is placed into the open channel through the lengthwise opening S122, it may optionally be subjected to a pre-aligning magnetic field which may be, for example and not by way of limitation, characterized as having a direction transverse to the elongate channel axis, running along the elongate channel axis, or continuously varying in direction with respect to the elongate channel axis. During the channel-filling process S122 mechanical shock or vibration S123 may be applied in order to aid in the compacting of the anisotropic magnetic powder material in the interior volume of the channel. After the anisotropic magnetic powder material is placed into the channel, the channel is formed closed S124 (see FIGS. 6A and 6B) and sealed S125 by seam welding or chemical bonding, forming a tube that contains the anisotropic magnetic powder material. Steps S120-S125 may operate continuously at a feed rate until a desired length of filled tube has been produced. When a desired filled tube length has been produced, the continuous production process of steps S120-S125 may be halted, the ends of the filled tube trimmed to a desired length, and the tube ends sealed as herein described, step 126. The steps of filling, pre-aligning, optional vibrating, and tube sealing may be carried out in an oxygen-free environment, such as within a chamber from which oxygen has been purged such as by applied vacuum or nitrogen fill.

Once an elongate filled and pre-aligned tube has been produced by the method of the invention, the filled tube may proceed to S200 (see FIG. 4A), in which the tube is compressed and size reduced, densifying the anisotropic magnetic powder material within the tube and achieving a desired cross-sectional shape and dimension, optionally sintered, and subjected to one or more applied final magnetizing fields.

Figure 4A:
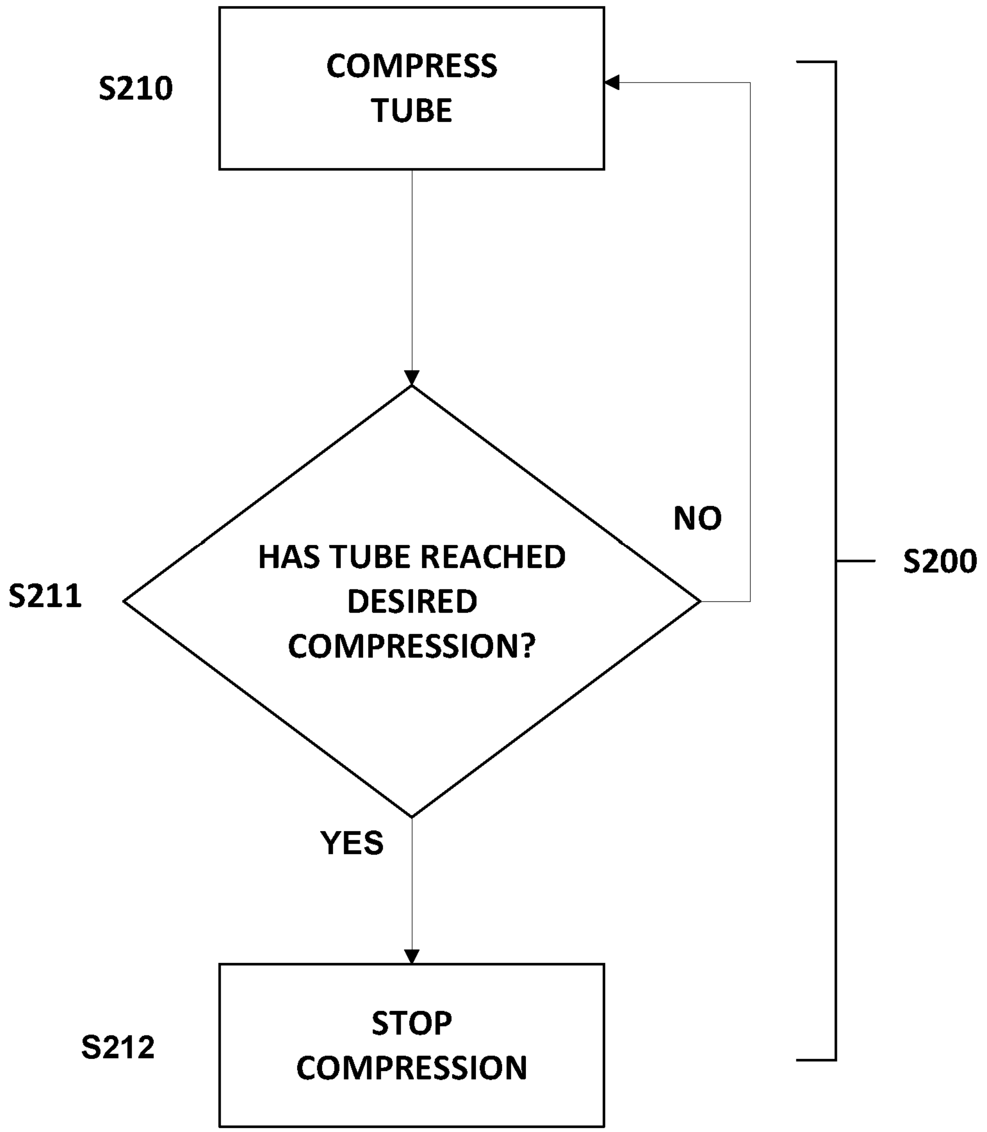
FIG. 4A depicts an embodiment of the compression step S200 of the method of the invention, in which the tube is compressed and its cross-sectional area is reduced, resulting in a final desired cross-sectional shape and outer dimension. In the case in which elongated permanent magnets of pre-defined length are being produced, the step of compressing the elongated permanent magnets may be repeated, and once the magnetic powder inside the tube reaches a maximum density, which may be up to eighty percent (80%) of the interior volume of the tube, the magnetic powder becomes substantially incompressible, resulting in elongation of the permanent magnet being produced as it passes through subsequent, repeated compression steps.

Referring now to FIG. 4A, a basic process flow of an embodiment of the system of the invention is depicted in which step S200 is further defined. In step 210, the tube is compressed, reducing its cross-sectional size, compacting the anisotropic magnetic powder material within the tube, and forming the desired final tube shape. This process is usually iterative, requiring multiple passes through forming rollers (see FIGS. 7A-7C), because the tube material may only be able to reduced in the forming process by up to ten percent (10%) along an exterior dimension without reaching stress failure of the tube material. In embodiments, the size reduction of the tube during the forming process may be limited to five percent (5%) size reduction of an exterior dimension in any direction to prevent stressing the tube material to failure. If the tube has not reached the desired cross-sectional shape and size (see FIGS. 7D-7I for exemplary, non-limiting cross sectional shapes) S211, the tube compression step 210 is repeated. This process is repeated until the desired compressed tube cross-sectional shape and size are achieved.

Figure 4B:
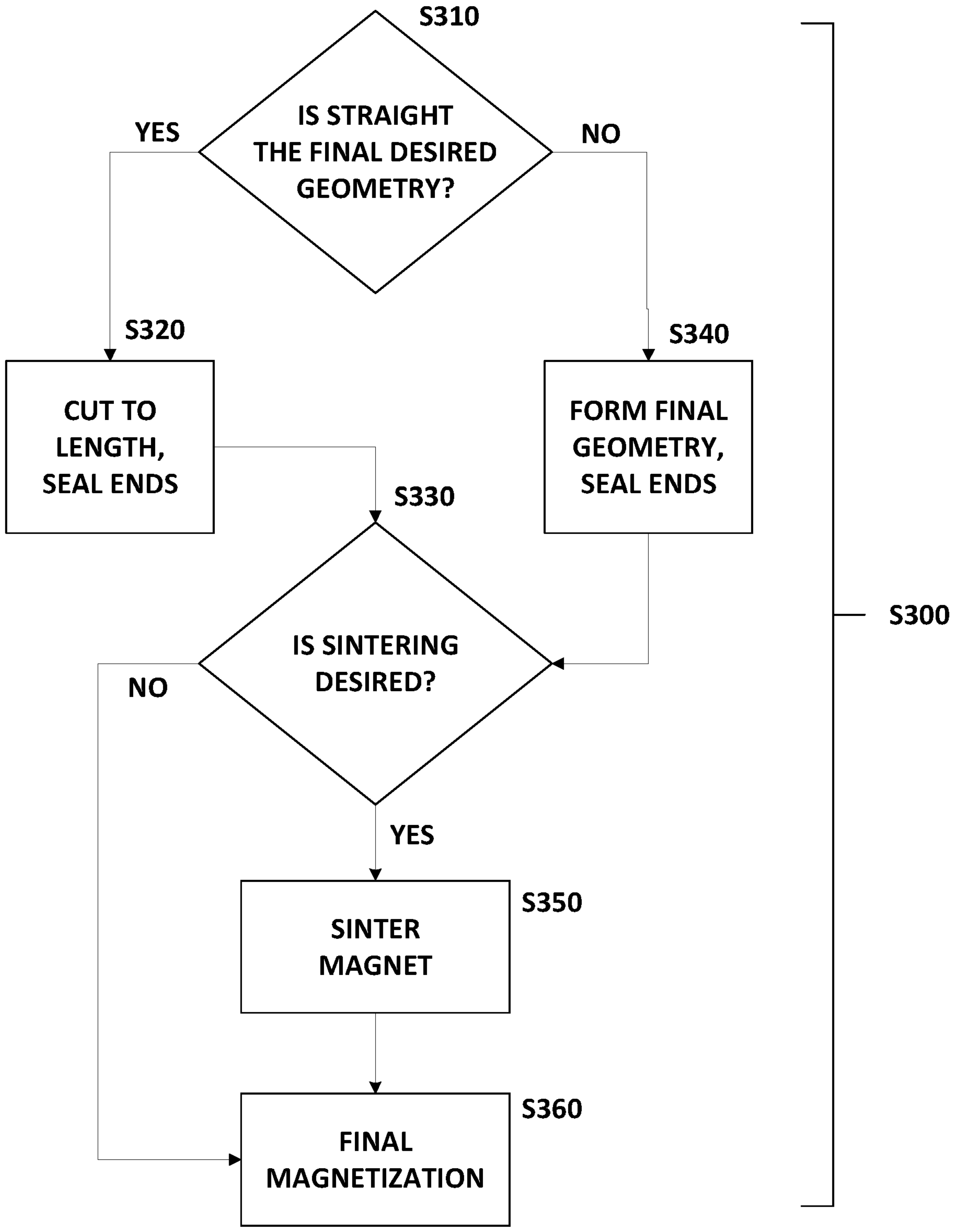
FIG. 4B depicts a flow chart for an embodiment of step S300, the final forming and magnetization step, resulting in a desired permanent magnet having a desired lengthwise form such as straight, curvilinear, ring, coil or other shape. The resulting permanent magnet comprises magnetic powder material that does not require any bonding agent to hold its form, because it is contained with the tube, and it has been compressed to its maximum density, forming a permanent magnet that has a desired shape and magnetization, and is characterized as exhibiting a stronger magnetic field than permanent magnets of the prior art.

Referring now to FIG. 4B, a flow chart depicting the final steps of lengthwise forming and final magnetizing the elongated filled tube is depicted, S300. After the tube has been filled with anisotropic magnetic powder and subjected to the pre-alignment magnetizing field, it is ready for the subsequent steps leading to final forming of the lengthwise geometry of the permanent magnet, and final magnetization of the permanent magnet. In step S310 a decision is made as to whether the final lengthwise geometry will be straight, meaning having a linear elongated axis Z, or whether the final lengthwise geometry of the finished permanent magnet will be non-straight, meaning having a nonlinear elongated axis Z. If the final lengthwise geometry is straight, the tube may be cut to length and its ends sealed by welding or bonding a cap onto both ends of the cut length of tube, filling the ends with epoxy or some other material, or any other means as may be known in the art, S320. In a next step S330, a decision is made as to whether it is desired to subject the permanent magnet to sintering. If the magnet will not be sintered, it may proceed to a final magnetization step S360 as a permanent magnet having a straight lengthwise geometry. Exemplary embodiments of such magnetization steps are depicted in FIGS. 9A-9H. If sintering is desired, centering is performed S350, and then final magnetization as depicted in FIGS. 9A-9H may be performed, resulting in a completed, finished magnet having a straight lengthwise geometry and desired magnetic field. Returning to step S310, if a non-straight final lengthwise geometry is desired, the filled tube is lengthwise formed to the desired non-straight lengthwise geometry, using rollers or other forming tools as is known in the mechanical arts to create the desired non-straight final lengthwise geometry which may be, as example, curvilinear, ring, coil, or any arbitrary desired shape. The open ends of the filled tube may then be sealed as described herein S340. If centering is desired S330, sintering is performed as S350, and then final magnetization as depicted in FIGS. 11A-11D may be performed, resulting in a completed, finished magnet having a non-straight lengthwise geometry and desired magnetic field. Returning to step S330, if the permanent magnet will not be sintered, it may proceed to a final magnetization step S360 as a permanent magnet having a straight lengthwise geometry. Such magnetization steps are depicted in FIGS. 11A-11D.

The steps of the invention having been described generally, a more detailed discussion of the steps, and various apparatus' for carrying out the steps, follow.

Figure 5A:
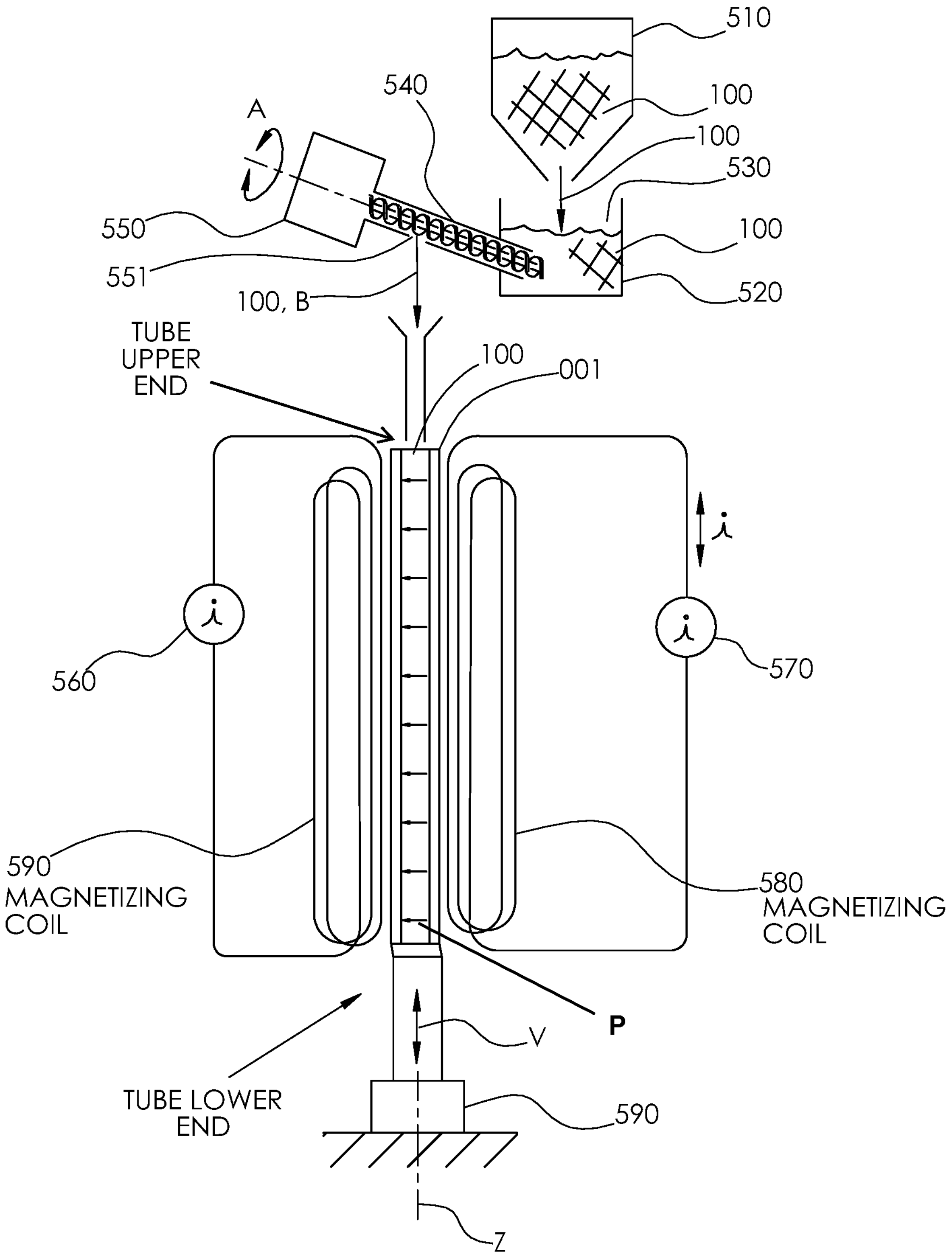
FIG. 5A depicts an exemplary embodiment of an apparatus and method for carrying out tube-filling step S100 for production of an elongated permanent magnet of pre-defined length, in which magnetic powder is poured into a hopper, and then augured in an angled upward direction at a metered rate, to be poured into the upper open end of a tube of pre-defined length. A pre-aligning magnetic field having a uniform transverse field direction is applied during the tube filling step, and mechanical stimulation, such as vibration, may also be applied.

Referring now to FIG. 5A, an embodiment of an apparatus and system for carrying out the step of filling a tube of defined length with a magnetic powder, for example the step S100 (see FIG. 1) as further defined as steps S110-S113 (see FIG. 2) is depicted. In this embodiment, the tube and the anisotropic magnetic powder material within it are subjected to a transverse uniform pre-aligning magnetic field by magnetizing coils, which may be saddle coils, 590 and 580. First, magnetic power material 100 is placed or poured into a hopper 510 where it is allowed to exit the hopper at a metered rate, falling under the force of gravity into container 520. A motorized auger or other transport system as may be known in the art 540, powered for example by motor 550 rotating the auger as depicted by arrow A, operates to transport the anisotropic magnetic powder material 100 upward out of container 520 and at an angle along auger 540. The anisotropic magnetic powder material 100 encounters opening S51 in auger 540, which allows the anisotropic magnetic powder material 100 to fall under the force of gravity along arrow B and to be funneled into the upper end of tube 001, While the anisotropic magnetic power material 100 is being motivated by gravity to fall from auger opening S51 into the upper end of tube 001 and continue to fall through tube 001 to the capped bottom end of tube 001, it is subjected to a pre-aligning magnetic field generated by magnetizing coils 580 and 570 which are energized by electric current sources 570 and 560, respectively. The pre-aligning magnetic field plays an important role in pre-aligning the anisotropic magnetic powder material 100 such that, once the tube 001 has been filled, anisotropic magnetic powder material 100 remains in a pre-aligned state. This pre-aligned estate enables final magnetization to be carried out using much less power, and a much lower energy magnetic field. For example, without magnetic pre-aligning, final magnetization fields of up to and surpassing to two Tesla may be required to achieve the desired magnetization of the final magnets areas however, using a pre-aligning magnetic field as depicted in FIG. 5A and in the other embodiments of the invention depicted herein, much lower final magnetization fields are required, which may be on the order of only 100 milliTesla or so. Further, vibration or other mechanical stimulation, such as shock, may be applied using an offset rotary vibrating apparatus 590 or a similar mechanical stimulation apparatus. In the exemplary embodiment depicted in FIG. 5A, a vibrator 590 is used to vibrate tube 001 the direction of arrow V while the anisotropic magnetic powder material is being poured into tube 001 in the presence of pre-aligning magnetic field. The use of vibration may be used in any embodiment of the invention during the tube filling process in order to aid in compacting the anisotropic magnetic powder material to achieve higher densities prior to the following compression into production stages of the method of the invention. In the exemplary embodiment depicted in FIG. 5A, the magnetic field produced by magnetizing coils 580 and 590 is oriented transverse to axis Z of tube 001, as depicted by the arrows shown in tube 001. The pre-alignment magnetizing scheme using exemplary saddle coils 580 and 590 is depicted in FIG. 5A may be used to produce a uniform transverse oriented magnetic field for pre-aligning the anisotropic magnetic powder material 100 as it falls into and comes to rest in the tube 001.

Figure 5B:
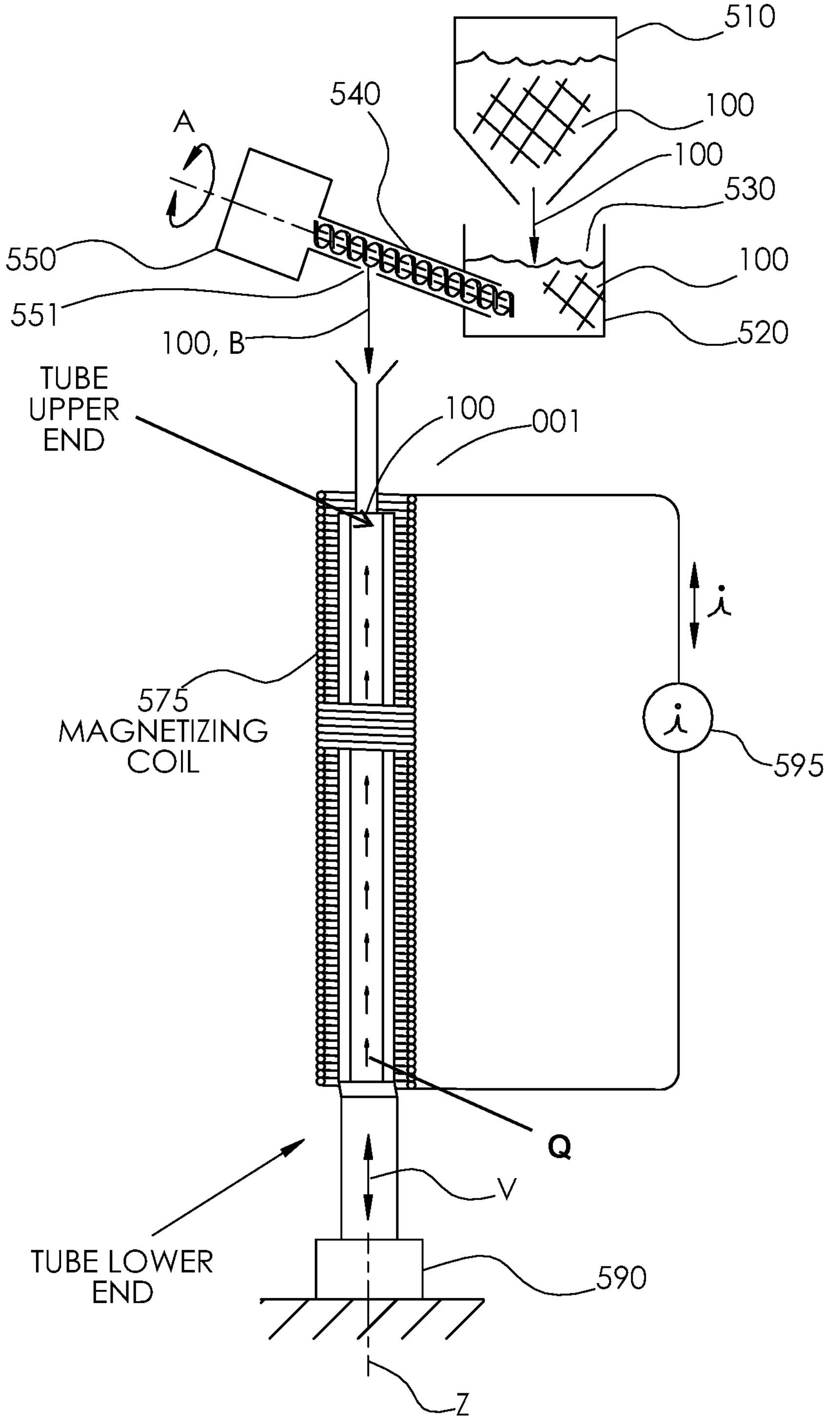
FIG. 5B depicts an exemplary embodiment of an apparatus and method for carrying out tube-filling step S100 for production of an elongated permanent magnet of pre-defined length, in which magnetic powder is poured into a hopper, and then augured in an angled upward direction at a metered rate, to be poured into the upper open end of a tube of pre-defined length. A pre-aligning magnetic field having an axial field direction, that is, the lines of magnetic flux are aligned with an axis of the tube, is applied during the tube filling step, and mechanical stimulation, such as vibration, may also be applied.

Referring now to FIG. 5B, an embodiment of an apparatus and system for carrying out the step of filling a tube of defined length with a magnetic powder, for example the step S100 (see FIG. 1) as further defined as steps S110-S113 (see FIG. 2) is depicted. In this embodiment, the tube and the anisotropic magnetic powder material within it are subjected to a transverse uniform pre-aligning magnetic field by magnetizing solenoid 570. The embodiment of the tube filling apparatus and system depicted in FIG. 5B is similar to that depicted in FIG. 5A with the exception that, in this case, instead of opposing saddle coils 590 and 580, a magnetizing solenoid 575 is used to generate an axially oriented magnetic field as depicted by the arrows in tube 001, depicting the axial direction of the magnetic field produced by magnetizing coil 575 when it is energized by current source 595. In this case, the pre-aligning magnetic field is aligned with tube axis Z, i.e., it is actually aligned with the tube.

Figure 5C:
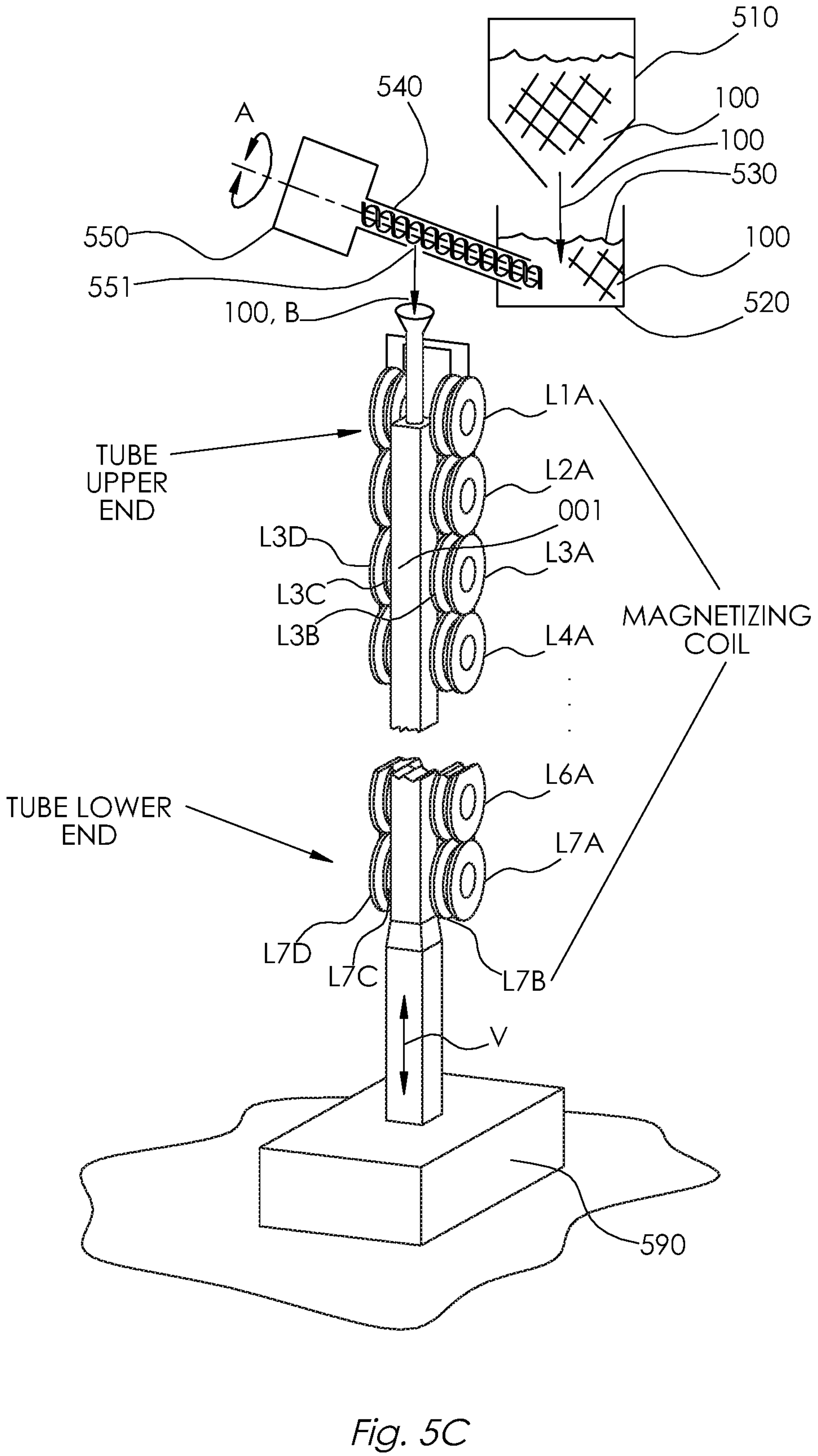
FIG. 5C depicts an exemplary embodiment of an apparatus and method for carrying out tube-filling step S100 for production of an elongated permanent magnet of pre-defined length, in which magnetic powder is poured into a hopper, and then augured in an angled upward direction at a metered rate, to be poured into the upper open end of a tube of pre-defined length. A pre-aligning magnetic field having a continuously changing field direction along the tube axis is applied during the tube filling step, and mechanical stimulation, such as vibration, may also be applied to compact the magnetic powder material in the tube and to keep the magnetic powder material from forming obstructing clumps under the influence of the magnetic field while the magnetic powder material is being poured into the tube.
Figure 5D:
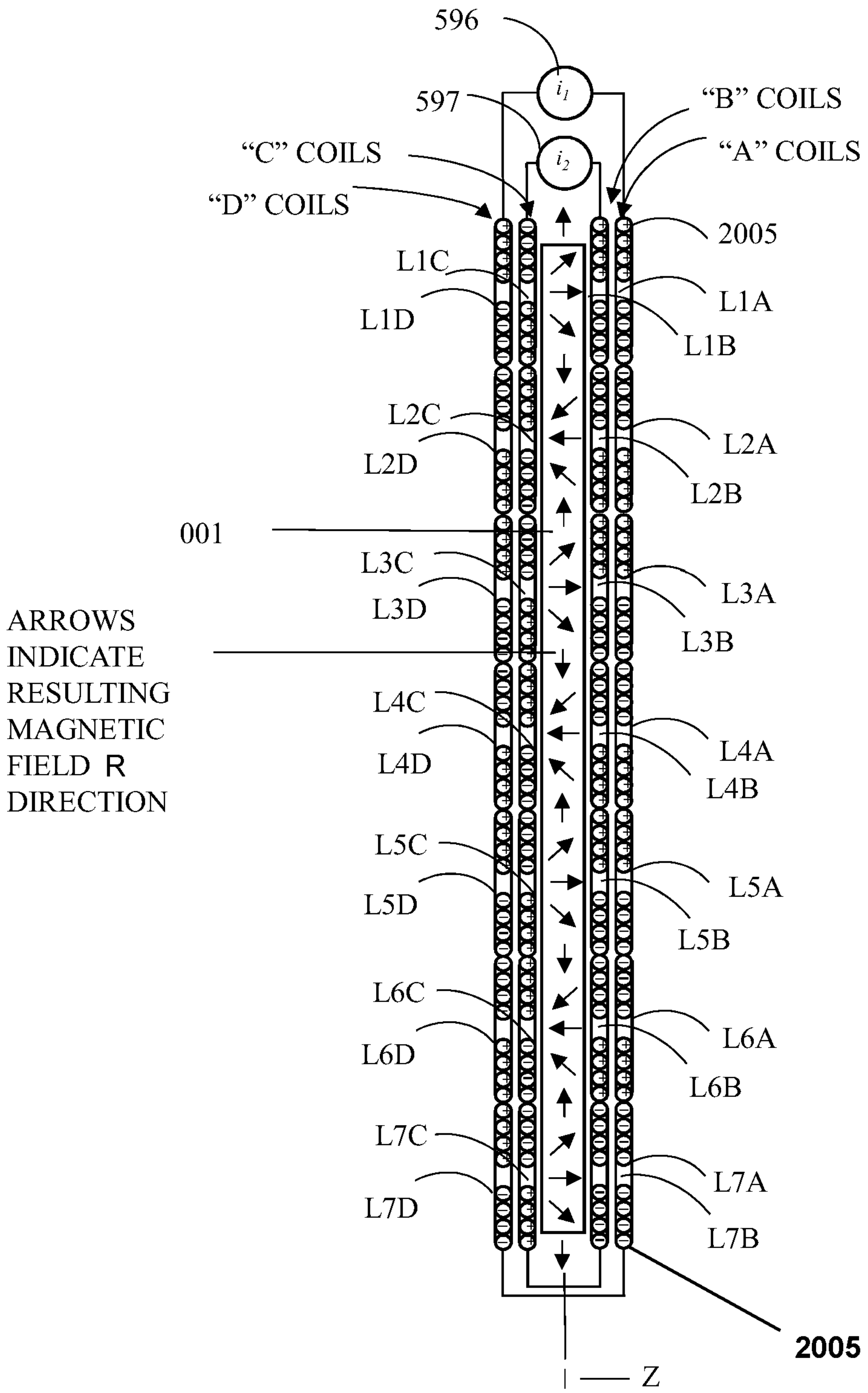
FIG. 5D depicts a cross sectional view of an embodiment of coils used to produce the magnetic field having a continuously changing field direction along the tube axis in the apparatus of FIG. 5C, showing current direction, and the direction of the resulting magnetic field applied to the tube while it is being filled with the magnetic powder material.

Referring now to FIGS. 5C and 5D, an embodiment of an apparatus and system for carrying out the step of filling a tube of defined length with a magnetic powder, for example the step S100 (see FIG. 1) as further defined as steps S110-S113 (see FIG. 2) is depicted. In this embodiment, the tube 001 and the anisotropic magnetic powder material 100 within it are subjected to a lengthwise-continuously varying pre-aligning magnetic field produced by magnetizing coils L1A-L7A, L1B-L7B, L1C-L7C, and L1D-L7D. When these coils are energized by an electric current produced by electric current sources 596 and 597 is depicted in FIG. 5D. In this embodiment of the tube filling step of the invention, innocent tropic magnetic powder material 100 is received into hopper 510, falls into container 520, is augured upwards at an angle by auger 540, which may be rotated by motor 550, where magnetic powder material 100 encounters opening 551 in auger 540, allowing the innocent tropic magnetic powder material 100 to fall and be funneled into the upper end of tube 001, as discussed in relation to FIGS. 5A and 5B. Two sets of realigning magnetizing coils are arranged in opposing fashion on opposite sides of tube 001. In the case shown in FIGS. 5C and 5D, it is intended to subject tube 001 to a continuously varying magnetic field having field characteristics as depicted by the arrows in FIG. 5D in which it can be seen that a continuously varying magnetic field direction has been produced by the four sets of coils. The four sets of coils may be defined as a set of A coils, B coils, C coils and D coils. Coil set A and coil set D are connected in series and are connected to current source 596; likewise, coil set B and coil set C are also connected in series and are energized by electric current source 597, such that the current that flows through the coils is indicated by the plus and minus symbols depicted in conductors 2005, where a + indicates a current exiting the figure and a – symbol indicates an electric current entering the figure. When the four sets of coils are energized such that current flows as indicated in FIG. 5D, the continuously varying magnetic field for pre-aligning the anisotropic magnetic powder in tube 001 is produced. Since tube 001 is disposed within the magnetic field produced by the energized coils depicted in FIG. 5D, the magnetic powder material 100 in tube 001 is subjected to and is magnetically pre-aligned to the continuously varying magnetic field. Again, the pre-alignment of anisotropic magnetic powder material 100 as it is falling into tube 001 results in a pre-alignment of the magnetic material such that a much lower magnetic field strength is required for final magnetization.

Figure 6A:
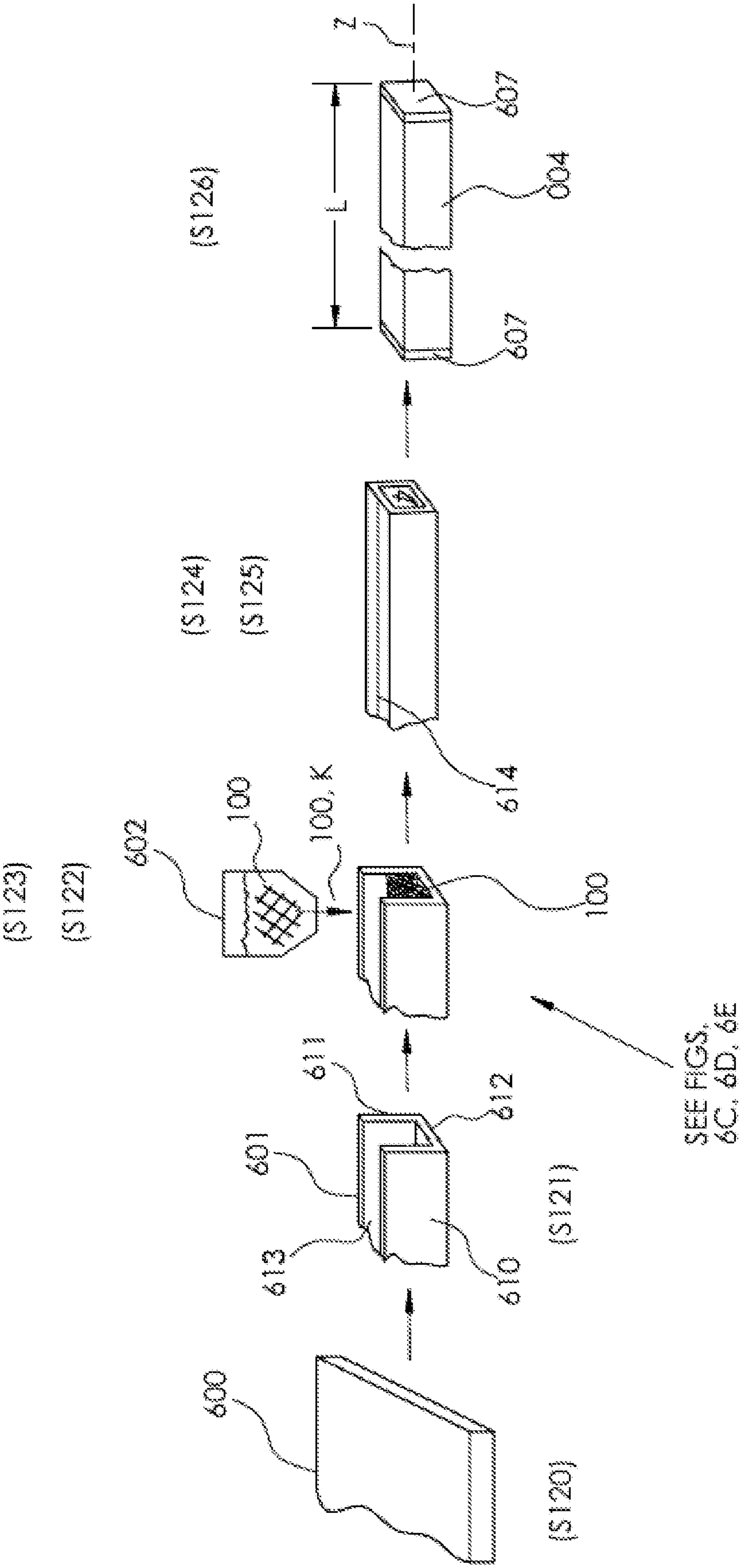
FIG. 6A depicts an exemplary embodiment of an apparatus and method for carrying out tube-filling step S100 for production of an elongated permanent magnet that is continuously produced, in which a flat sheet of material is formed into a channel having a lengthwise opening, magnetic powder is poured into the lengthwise opening as the channel is motivated along to continuously receive the magnetic powder into the lengthwise opening, after which the lengthwise opening is formed closed, all on a continuous basis. The process may be fed by a reel or roll of flat sheet material.
Figure 6B:
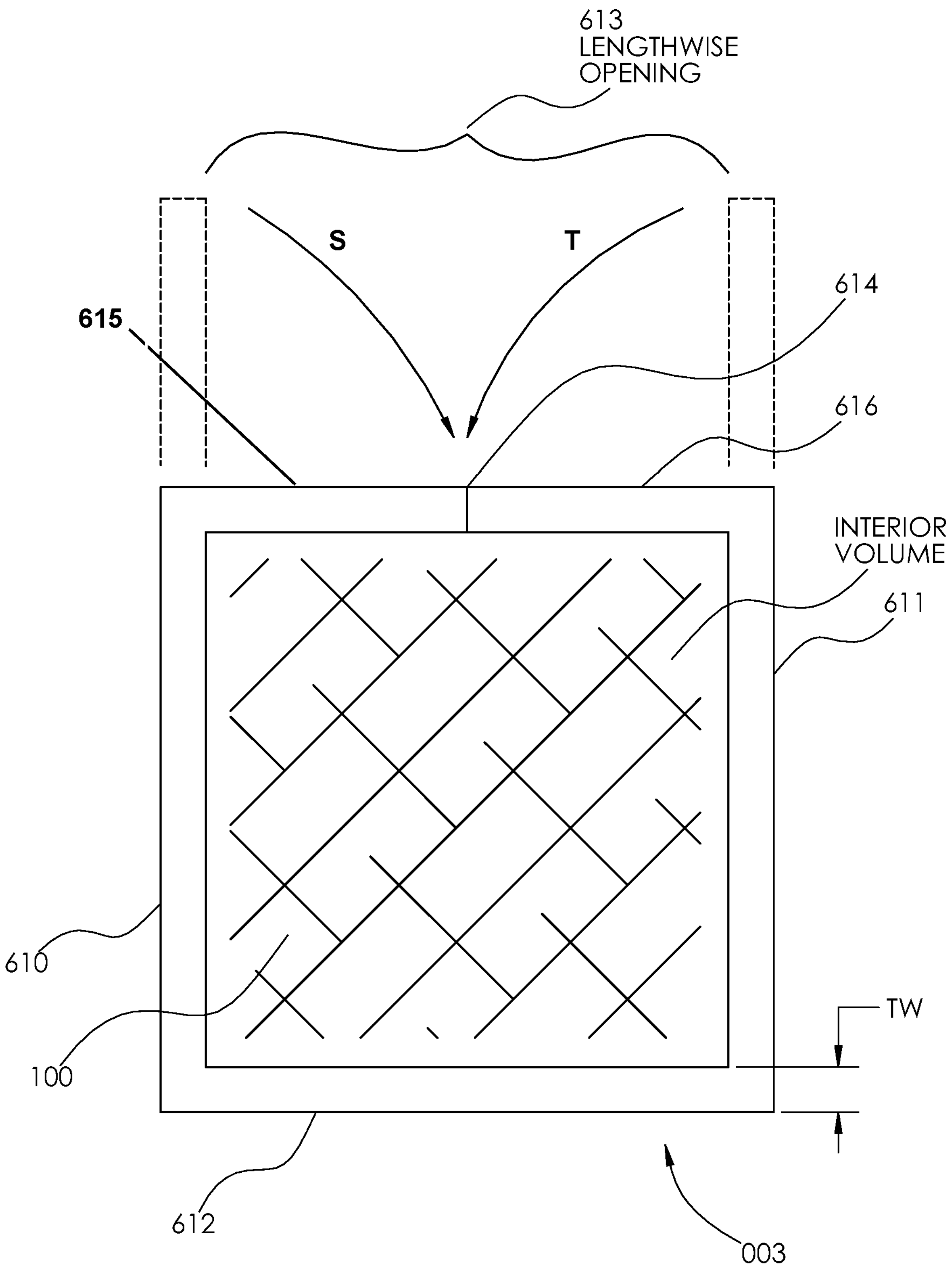
FIG. 6B depicts an exemplary embodiment of a cross section of channel of the continuous tube-filling method and system depicted in FIG. 6A for the purpose of showing how the walls of the lengthwise opening are formed closed and the resulting seam is sealed, forming a tube having a closed cross section that has an interior volume that is filled with magnetic powder material.

Referring now to FIGS. 6A and 6B, an embodiment of an apparatus and system for carrying out the step of continuously filling a tube of defined length with a magnetic powder material, for example the step S100 (see FIG. 1) as further defined as steps S120-S126 (see FIG. 3) is depicted. This continuous method of filling the tube with magnetic powder material, up through and including the step of sealing the lengthwise seam formed by the closing of the lengthwise opening, may be, and is preferably, carried out in an oxygen-free environment. The oxygen-free environment may be achieved by performing these steps in an enclosed environment that has been purged of oxygen by applying a vacuum, by pressuring with an inert gas such as nitrogen, or by other means known in the art. This purging of oxygen may be required in those cases in which the magnetic powder material comprises powdered metal alloys which may oxidize when exposed to oxygen. A sheet material 600, which may comprise or consist of non-magnetic material, may be provided (step S120) and then continuously formed into a channel 601 having first sidewall 611, second sidewall 610, bottom 612, and lengthwise opening 613. Magnetic powder material 100 is poured into, or placed into, channel 601 along arrow K, for example by gravity feed, from hopper 602 that has been at least partially filled with magnetic powder material 100. Magnetic powder material 100 is poured into channel 601 at a volumetric rate so as to fill the resulting tube interior volume as depicted in FIG. 6B when portions 615 and 616 of first sidewall 610 and second sidewall 611 have been formed by forming rollers so as to fold along arcs S and T, respectively, to have their edges meet to form lengthwise seam 614 in the resulting tube 003. Resulting tube 003 has a closed cross section (i.e., resulting tube 003 no longer has a lengthwise opening 613). Seam 614 may be sealed by any means known in the art such as welding or chemical bonding by passing the filled and formed tube through a metal seam welder, in which seam 614 is welded at the seam rate, or through a chemical bonding station, in which a chemical bonding agent is continuously applied to seam 614 at the feed rate. The forming of channel 601 and the forming of sidewall portions 615 and 616 to create lengthwise seam 614 may be accomplished by any means known in the art, such as the use of forming rollers. The forming of channel 601, the filling of channel 601 with magnetic powder material 100, the forming of sidewall portions 615 and 616 to create lengthwise seam 614, and the sealing of lengthwise seam 614 may all be accomplished in a continuous process at a feed rate at which the input sheet material is continuously fed into the process, and the resulting tube 003 filed with magnetic powder material 100 exits the process at the feed rate. The resulting tube 003 that is filled with magnetic powder material 100 may then be cut to length L and its ends sealed by welding or chemical bonding an end cap 607 to each end, filling each end with epoxy or other sealant, or any other method known in the art, forming a permanent magnet 004. The sealing of the ends of the tube is intended to protect the contained magnetic powder material 100 from the corrosive effects of oxygen. The feed rate of the continuous tube form, fill and seam seal process may be any feed rate, but in an exemplary embodiment is up to and including twenty (20) meters per minute.

Figure 6C:
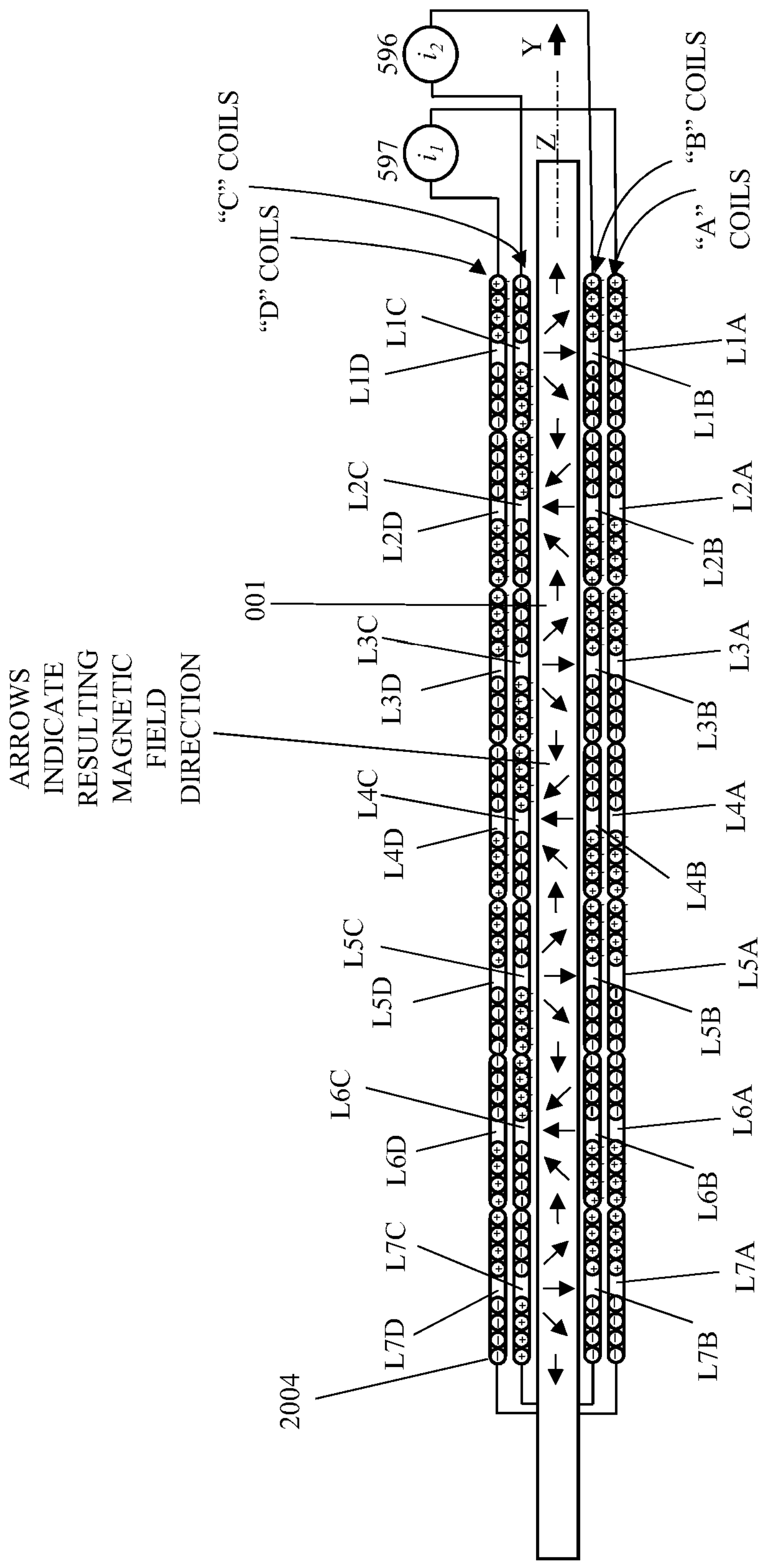
FIG. 6C depicts an embodiment of a pre-aligning setup used during the tube filling step S122 as depicted in FIG. 6A to achieve a continuously varying magnetic pre-alignment of the magnetic powder material in the formed channel. While magnetic powder material is being placed or poured into the open channel it is subjected to the pre-aligning magnetic field produced by the energized coils depicted in FIG. 6C.

Referring now to FIG. 6C, an embodiment of a scheme for magnetic pre-alignment, on a continuous basis, of the anisotropic magnetic powder as it fills channel 601 is depicted. As depicted and discussed in relation to FIGS. 5C and 5D, a similar scheme is used as depicted in FIG. 6C to achieve a continuously varying magnetic pre-alignment of the anisotropic powder material 100 in channel 601. As discussed in relation to FIGS. 5C and 5D, the scheme of FIG. 6C also uses four sets of coils to outer sets, set A and set D that are connected in series and energized by current source 597, and to enter sets of coils, set B and set C which are connected in series and energized by current source 596. When the coils of FIG. 6C are energized by the current sources such that current flows in the directions indicated by the plus and minus signs in coil conductors 2004, a resulting continuously varying magnetic field, as depicted by the arrows shown in the channel in FIG. 6C, is generated subjecting the anisotropic magnetic powder material to the continuously varying magnetic field as it is poured into channel 601. In addition, mechanical stimulation such as shock or vibration may be applied to channel 601 while the anisotropic magnetic powder material 100 is being poured into channel 601 in order to provide a denser packing of the anisotropic magnetic powder material 100. Channel axis Z is shown in the figure for reference. In FIG. 6C, the direction of travel of channel 601 is indicated by arrow Y. In an embodiment, the continuous manufacture of the channel, the continuous pre-aligning magnetization depicted in FIGS. 6C, 6D and 6B, and the forming of the closed to creating seam 614 which is then sealed, may be in a continuous, uninterrupted fashion or may be in a continuous stepwise fashion in which the filling in pre-aligning magnetization step are allowed to complete for a section of channel, and then the channel is advanced to the next section, where advancement is stopped while pre-alignment is occurring, and once pre-alignment is finished, the channel is then advanced again to the next section where pre-alignment occurs for a set period of time, and so on.

Figure 6D:
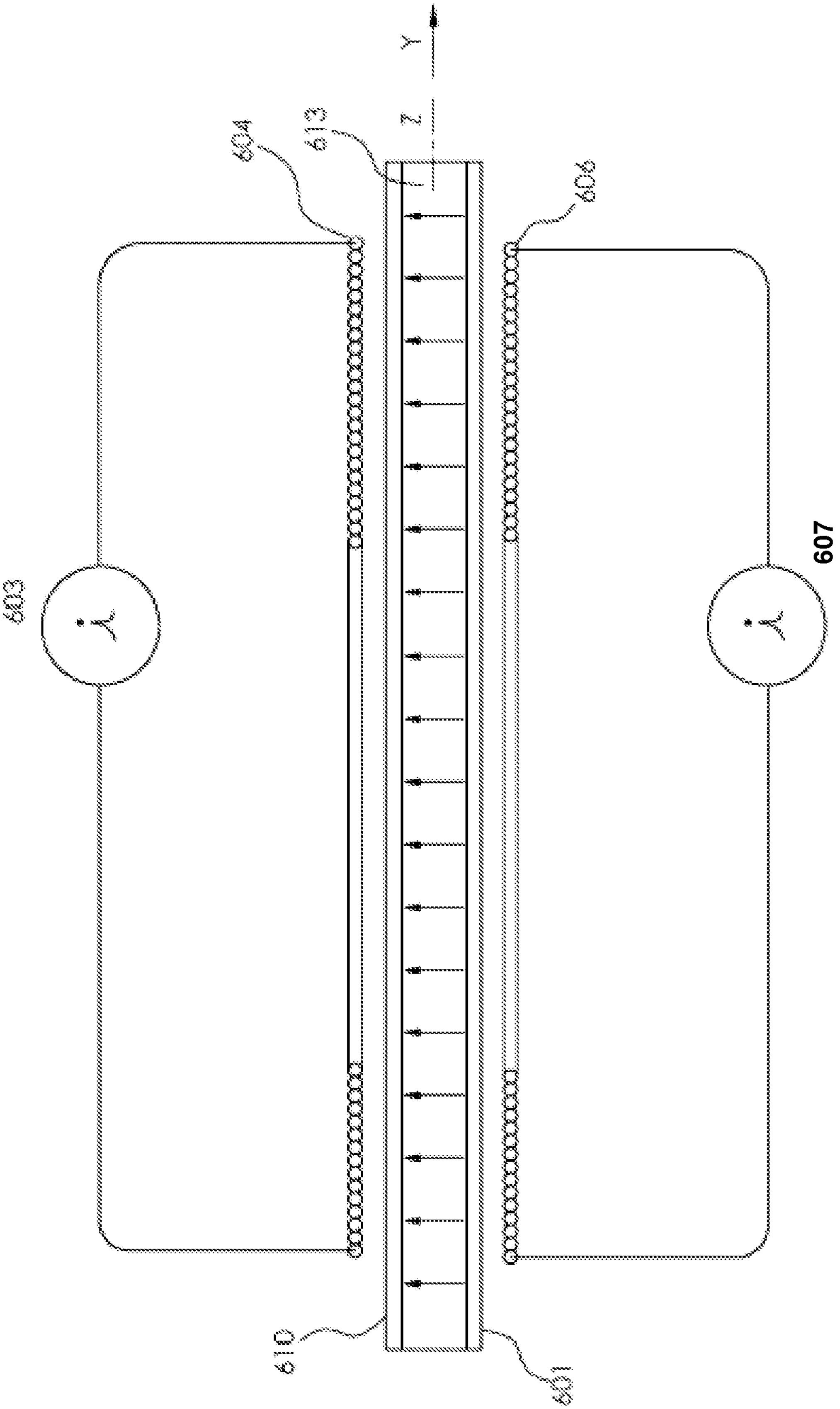
FIG. 6D depicts an embodiment of a pre-aligning setup used during the tube filling step S122 as depicted in FIG. 6A to achieve a uniform transverse magnetic pre-alignment of the magnetic powder material in the formed channel. While magnetic powder material is being placed or poured into the open channel it is subjected to the pre-aligning magnetic field produced by the energized coils depicted in FIG. 6D.

Referring now to FIG. 6D an embodiment of the continuous tube fill, pre-alignment and sealing process of FIG. 6A is depicted in which the pre-alignment is carried out by opposing saddle coils 604 and 606, which are energized by current sources 603 and 607, respectively. In the embodiment depicted in FIG. 6D, a transverse magnetic field is indicated by the arrows shown in channel 601 is produced when saddle coils 604 and 606 are energized. The direction of the magnetic field produced is transverse to channel axis Z. The direction of travel and sealing is depicted by arrow Y.

Figure 6E:
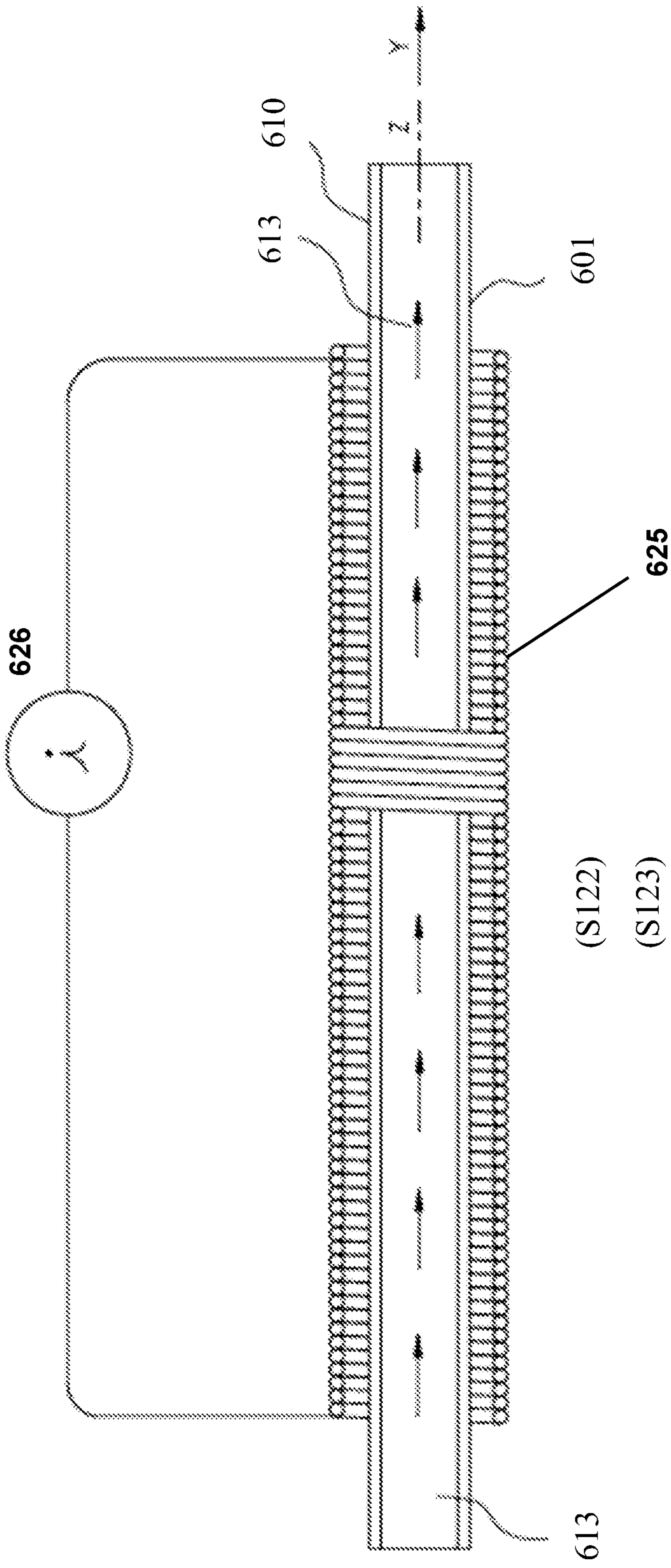
FIG. 6E depicts an embodiment of a pre-aligning setup used during the tube filling step S122 as depicted in FIG. 6A to achieve an axially-directed magnetic pre-alignment of the magnetic powder material in the formed channel. While magnetic powder material is being placed or poured into the open channel it is subjected to the pre-aligning magnetic field produced by the energized coils depicted in FIG. 6E.

Referring now to FIG. 6E an embodiment of the continuous tube fill, pre-alignment and sealing process of FIG. 6A is depicted in which the pre-alignment is carried out by solenoid 625, which is energized by a current 626. In the embodiment depicted in FIG. 6D, an axially aligned magnetic field is indicated by the arrows 613 shown in channel 601 is produced when solenoid 625 is energized. The direction of the magnetic field produced is along channel axis Z. The direction of travel for the continuous fill, pre-alignment and sealing is depicted by arrow Y.

Figure 7B:
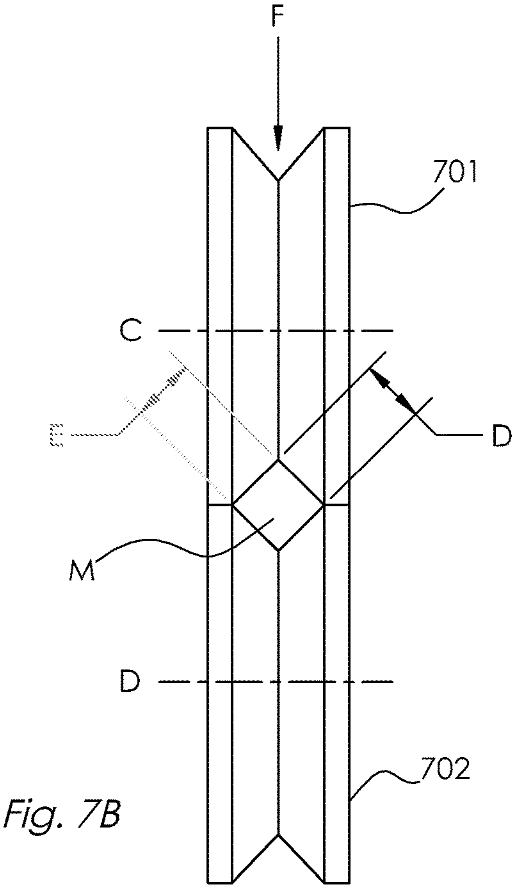
FIGS. 7A-7C depict an exemplary embodiment of an apparatus that may be used to carry out compression of the filled tube, for example as in step S200. The compression and size reduction steps may be repeated until maximum compression (eighty percent by volume ratio of magnetic powder volume to interior volume of the tube) of the magnetic powder material filling the tube is achieved, and continuing subsequent repeated steps of compression resulting in tube lengthening of up to thirty percent over the original uncompressed tube length, until a desired tube cross sectional shape, cross sectional dimension and length are achieved.
Figure 7C:
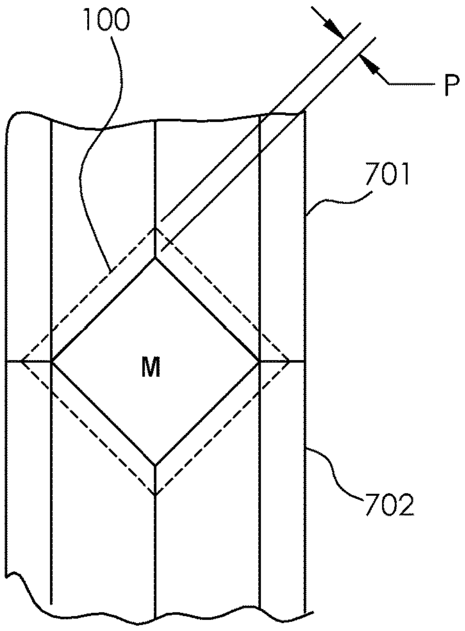
Figure 7A:
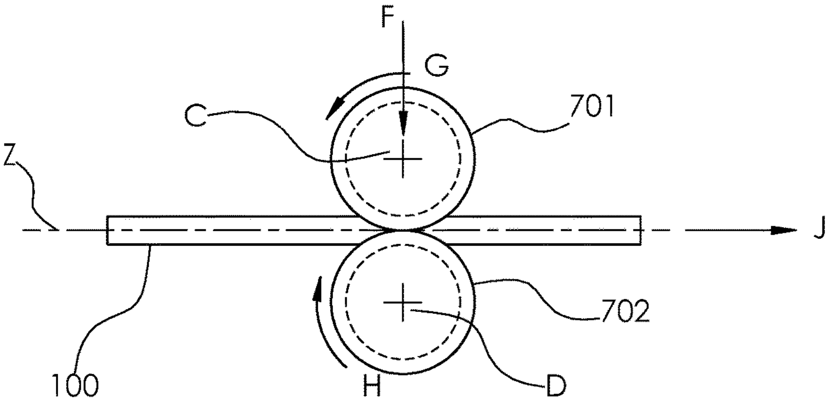
Figure 7D:
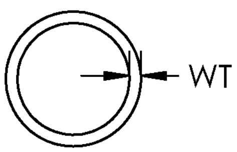
FIGS. 7D-7I depict exemplary embodiments of cross-sectional shapes of filled tubes that may be produced by the method and system of the invention.
Figure 7E:
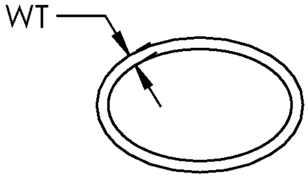
Figure 7F:
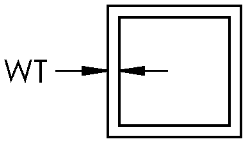
Figure 7G:
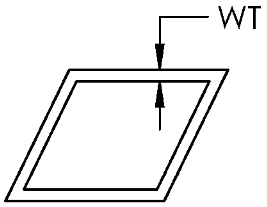
Figure 7H:
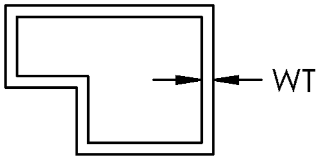
Figure 7I:
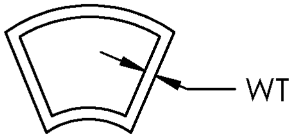

Referring now to FIGS. 7A-7C, an embodiment of an apparatus and system for carrying out the step of compressing the tube, for example the step S200 (see FIG. 1) as further defined by steps S210-S212 (see FIG. 4), is depicted. A set of rollers 701 and 702 which are brought together by a force F between the rollers, which may be rotating in directions G and H, is depicted in FIG. 7A as operating to compress a tube 001 of the invention containing anisotropic magnetic powder material 100 as follows. For the compression and tube size reduction step, a series of compressing rollers 701 and 702 may be employed, each series of rollers having a successively smaller opening M characterized by dimensions E and D in exemplary fashion in FIG. 7B. Referring to FIG. 7C, the tube to be compressed is generally selected to be larger in at least one dimension than opening M such that when the tube 001 is drawn into rollers 701 and 702 by the rotation of rollers 701 and 702, the tube is compressed, and the anisotropic magnetic powder material 100 inside the tube is also compressed. The opening between rollers 701 and 702 used for compressing the tube is shown to have an exemplary square cross-section M in FIGS. 7B and 7C, but is to be understood that any desired cross-sectional shape, which represents the final desired cross-sectional shape of the tube, may be formed by the opening M between roller 701 and 702. During the compression step, the opening M is selected to be slightly smaller, P, on the order of 5% smaller in any given direction, than the tube 001 to be compressed. Thus, when rollers 701 and 702 are motivated to turn in directions G and H about axes C and D, respectively, by for example a motor or transmission system, a tube of the invention 001 containing anisotropic magnetic powder material 100, is brought into contact with rollers 701 and 702 as depicted in FIG. 7A, where it is drawn into the rollers and forced through opening M, reducing the overall exterior dimensions of the tube 001 and compressing the anisotropic magnetic powder material 100 disposed inside the tube. In a next step, a different set of rollers may be selected that, again, create an opening M that is smaller in at least one dimension than the already size reduced tube that has passed through the previous size reduction compression step. And thus this step is repeated until a desired tube cross-sectional shape and dimension have been produced. It is also not necessary that the beginning tube shape be similar in shape to the desired ending tube shape formed by the opening M between rollers 701 and 702. For instance, the initial tube 001 cross-sectional shape may be of circular cross-section. If a resulting desired square cross-section is intended, an initial set of rollers having dimensions E and D slightly smaller than the tube diameter would be selected. After passing through the rollers in an initial pass, the tube would be size reduced and its cross-sectional shape would have been changed from entirely circular to a cross-sectional shape that is mostly circular, with flat sides. With each successive pass through sets of rollers having successively smaller dimensions E and D, eventually the desired cross-sectional square shape and size would be achieved, and the anisotropic magnetic powder material 100 contained within the tube would have been compressed. Once the anisotropic magnetic material 100 has been compressed to a ratio in which anisotropic material by volume is 80% of the tube interior volume, it has been shown experimentally that further size reduction of the tube is not likely. Further passes through the size reduction apparatus of FIGS. 7A, 7B and 7C would then lead to a lengthening of the tube. Again, it has been shown experimentally that maximum lengthening of the tube prior to reaching failure of the tube walls is approximately 30%. In other words, once the original tube length has been increased to 130% of its original length, successive attempts to compress the tube further may lead to mechanical failure of the tube walls.

As an example of just one embodiment of a compression and size reduction scheme, a circular tube of 50 millimeter tube diameter, shape through forming stages to reach a final cross-section of 13 millimeter with a “pie like” cross-section. Still further, the forming process reduces the wall thickness of the tube. The tube thickness can be further reduced through secondary operations. In the example above the 50 millimeter tube has an approximate starting thickness of 1.0 millimeters and is drawn down to a final thickness of 0.25 millimeters.

Referring now to FIGS. 7D-7I, Various cross-sectional shapes representative of exemplary embodiments of the two cross-sections producible by the method and system of the invention are depicted. The purpose of the depictions in these figures is to show that any cross-sectional size and shape of tube may be produced by the method and system of the invention.

Figure 7J:
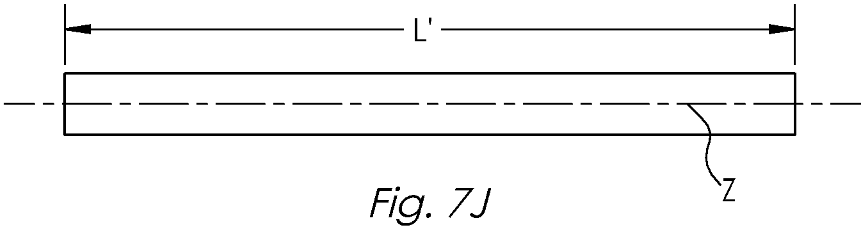
FIG. 7J depicts an exemplary length of filled tube that may be produced by the method and system of the invention, prior to final forming into a ring, coil, or other desired final form of permanent magnet, depicting a permanent magnet length L' and a longitudinal axis Z.
Figure 8:
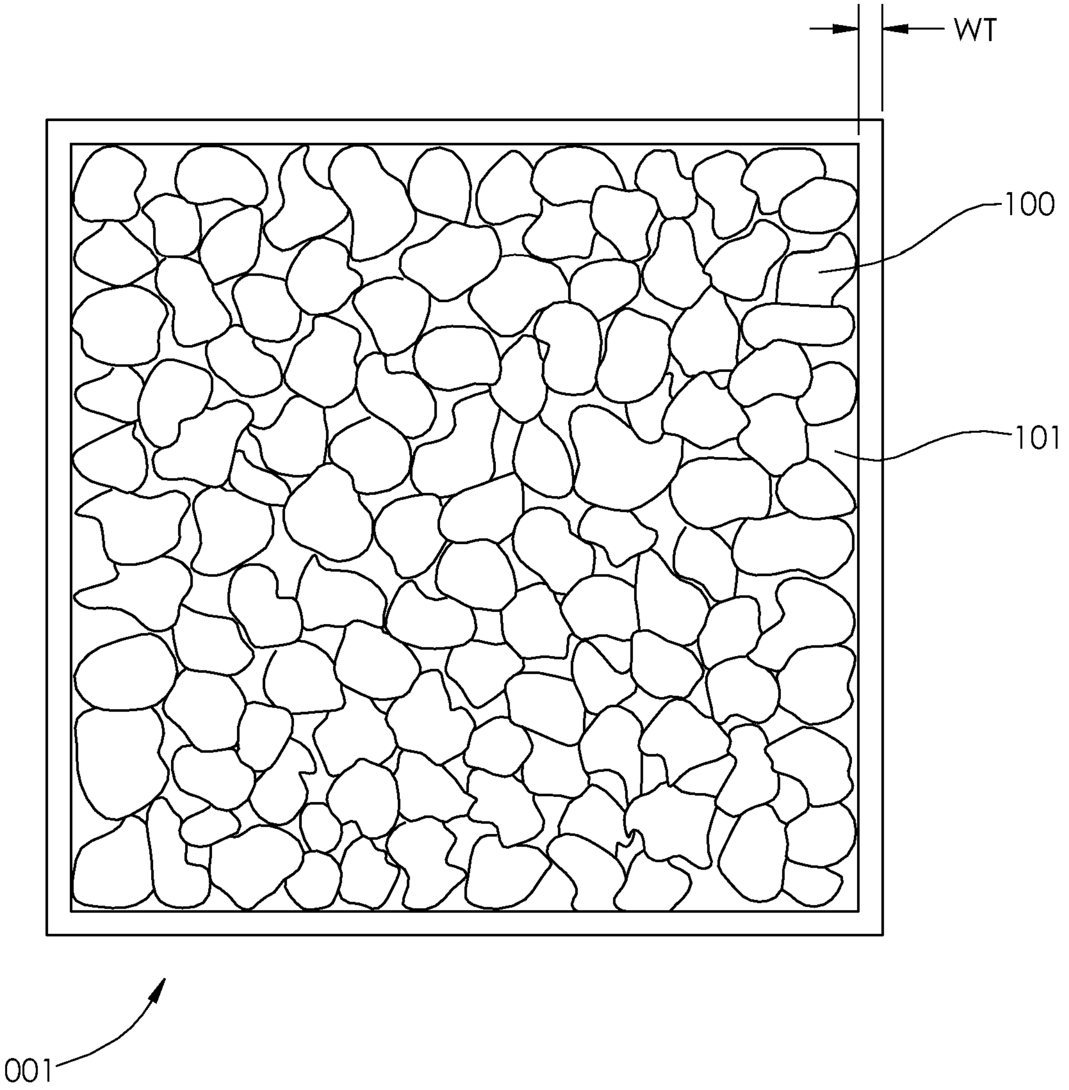
FIG. 8 depicts a cross sectional view of an elongated permanent magnet produced by the method of the invention that has been compressed to a point of maximum compression, which may, in some embodiments, be eighty percent (80%) by volume ratio of volume of magnetic powder material to tube interior volume.

Referring now to FIG. 8, a cross sectional view of an elongated permanent magnet produced by the system and method of the invention is depicted. Magnetic powder material 100 occupies an internal volume $V_{MPP}$ within the tube. Interstitial volumes 101, in which no magnetic powder material is present, are formed between particles of magnetic powder particles 100, taking up a volume $V_{ISV}$. It has been discovered through extensive experimentation that, for certain magnetic materials and for a given tube internal volume $V_{tube}$, the maximum ratio of the volume of magnetic powder particles 100 to the tube internal volume $V_{tube}$, or $V_{MPP}/V_{tube}$, is about 80%. Thus, once the tube has been compressed to the point that the magnetic powder material volume $V_{MPP}$ has reached eighty percent (80%) of the internal volume of the tube, further compacting of the magnetic powder material is not possible. After the tube cross section has been reduced by one or more passes through the compression step S200 of the method such that the maximum compression ratio of the magnetic powder material to the tube internal volume has reached eighty percent (80%), additional subsequent passes of the filled tube through the compression step S200 of the method do not result in further reduction in cross-sectional area of the tube, but rather result in elongation of the tube, resulting in elongation of the tube to a new length L' (see FIG. 7*j*) and thinning of the tube wall thickness WT. It has been determined through extensive experimentation that the maximum elongation of the filled, compressed tube by repeated passes through compression step S200 is one hundred thirty percent (130%) of the original uncompressed tube length L. Additional passes of the filled, compressed tube through the compression step S200 of the method after the filled, compressed tube length has reached one hundred thirty percent (130%) of the original uncompressed tube length will result in failure of the tube wall material due to stresses related to work hardening and resulting increased brittleness of the tube material.

Figure 9A:
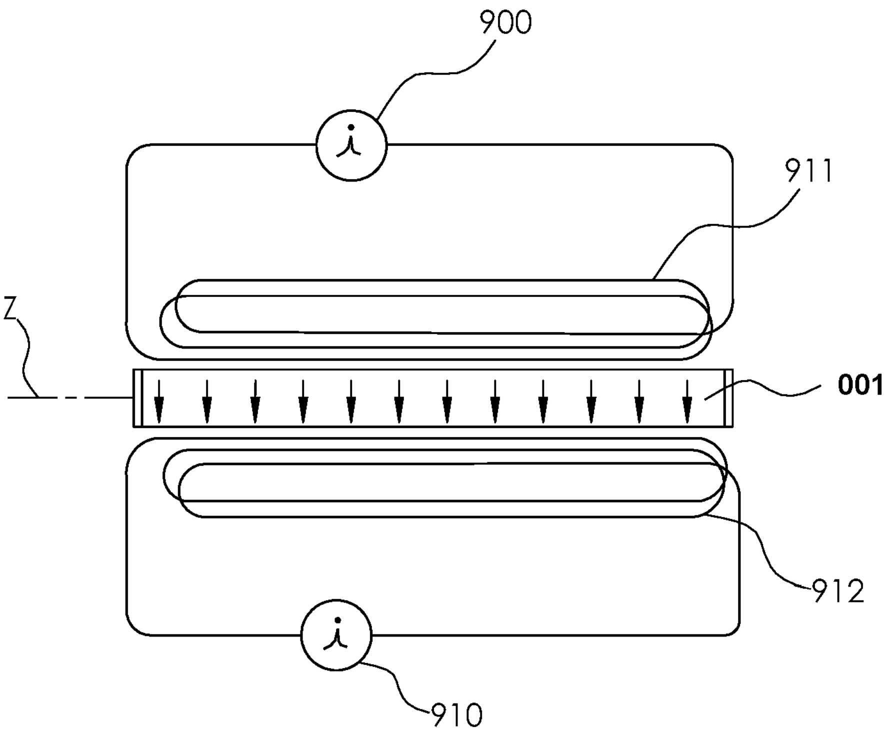
FIG. 9A depicts an exemplary embodiment of a final magnetization step, in which an elongated permanent magnet having a straight geometry (i.e., linear tube axis) is subjected to one or more final magnetization magnetic fields which produce magnetic field direction transverse to the tube axis. In embodiments, the final magnetization magnetic fields may be further characterized as being produced by one or more pulsed fields having predefined characteristics.

Referring now to FIG. 9A, an apparatus and system for final magnetization of an elongate permanent magnet of the invention is depicted. One or more magnetizing coils 911 and 912 may be placed in proximity to elongate permanent magnet 001 such that elongate permanent magnet 001 is subjected to a magnetic field when magnetizing coils 911 and 912 are energized by current sources 900 and 910, respectively. In the example shown, a magnetic field direction transverse to the elongate axis Z of the elongate permanent magnet 001 is generated by the magnetizing coil configuration depicted. In this case, an elongate permanent magnet having an elongate axis Z characterized by a persisting transverse magnetic field is produced as depicted in FIG. 9C.

Figure 9B:
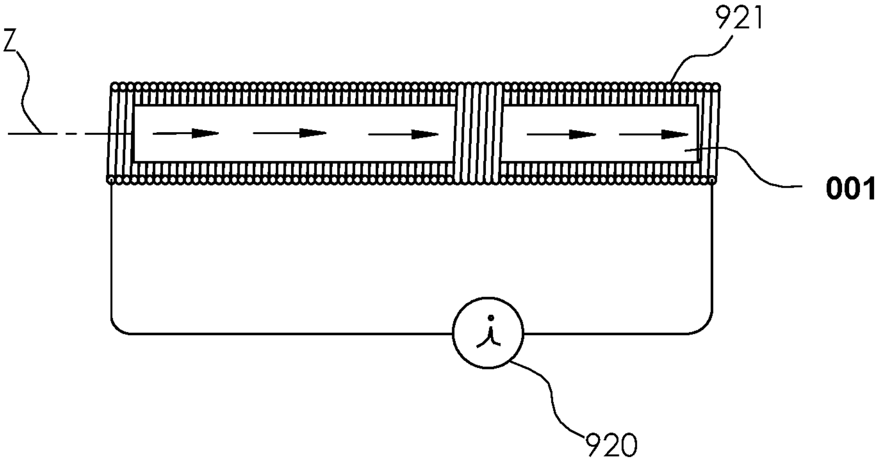
FIG. 9B depicts an exemplary embodiment of a final magnetization step, in which an elongated permanent magnet having a straight geometry (i.e., linear tube axis) is subjected to one or more final magnetization magnetic fields which produce magnetic field direction parallel to, i.e., along, the tube axis (i.e., axial magnetization). In embodiments, the final magnetization magnetic fields may be further characterized as being produced by one or more pulsed fields having predefined characteristics.

Referring now to FIG. 9B, an apparatus and system for final magnetization of an elongate permanent magnet of the invention is depicted. Elongate permanent magnet 001 may be placed with magnetizing solenoid 921 such that elongate permanent magnet 001 is subjected to an axially oriented magnetic field as depicted by the arrows in the figure, when magnetizing solenoid 921 is energized by current source 920. In the example shown in FIG. 9B, an axially-oriented magnetic field direction that runs along elongate axis Z of the elongate permanent magnet 001 is generated by the magnetizing solenoid configuration depicted. In this case, an elongate permanent magnet having an elongate axis Z characterized by a persisting axial magnetic field is produced as depicted in FIG. 9D.

Figure 9C:
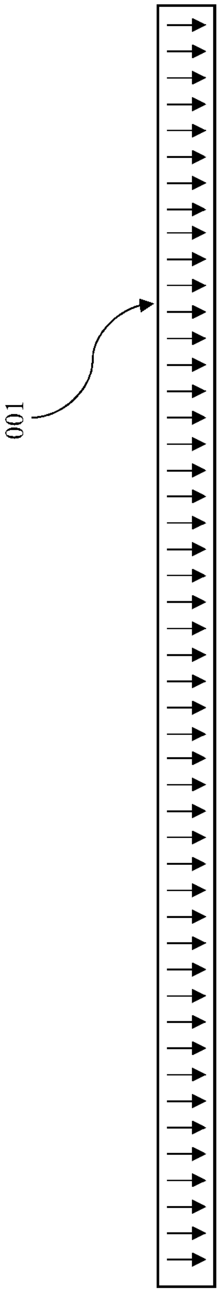
FIG. 9C depicts an exemplary embodiment of an elongate permanent magnet of the invention in which the tube has been filled with magnetic powder material, the magnetic powder material has been magnetically pre-aligned by the application of a pre-aligning magnetic field as depicted in FIG. 5A, the tube has compressed and cross-section reduced, and is now ready for the steps of final lengthwise forming and final magnetization. In the example shown the magnetic pre-alignment of the magnetic powder material in the tube during filling has resulted in a uniform magnetic field of direction transverse to the tube axis.

Referring now to FIG. 9C, an elongate straight permanent magnet having an elongate axis Z characterized by a persisting transverse magnetic field as produced by the final magnetization scheme depicted in FIG. 9A is depicted.

Figure 9D:
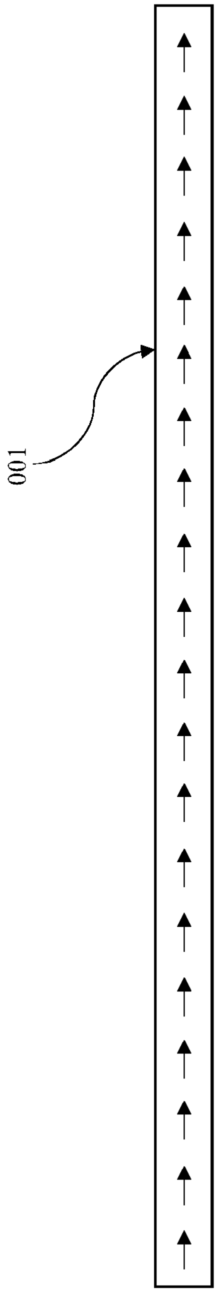
FIG. 9D depicts an exemplary embodiment of an elongate permanent magnet of the invention in which the tube has been filled with magnetic powder material, the magnetic powder material has been magnetically pre-aligned by the application of a pre-aligning magnetic field as depicted in FIG. 5B, the tube has compressed and cross-section reduced, and is now ready for the steps of final lengthwise forming and final magnetization. In the example shown the magnetic pre-alignment of the magnetic powder material in the tube during filling has resulted in a uniform magnetic field of direction along the tube axis.
Figure 9E:
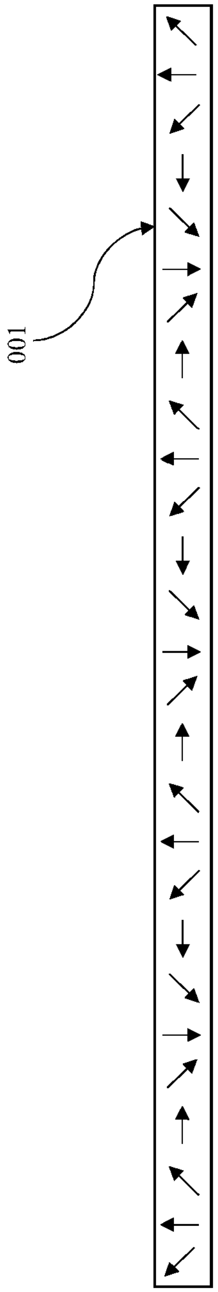
FIG. 9E depicts an exemplary embodiment of an elongate permanent magnet of the invention in which the tube has been filled with magnetic powder material, the magnetic powder material has been magnetically pre-aligned by the application of a pre-aligning magnetic field as depicted in FIGS. 5C and 5D, the tube has compressed and cross-section reduced, and is now ready for the steps of final lengthwise forming and final magnetization. In the example shown the magnetic pre-alignment of the magnetic powder material in the tube during filling has resulted in a continuously varying magnetic field relative to the tube axis.

Referring now to FIG. 9D, an elongate straight permanent magnet having an elongate axis Z characterized by a persisting axial magnetic field as produced by the final magnetization scheme depicted in FIG. 9B is depicted.

Figure 9F:
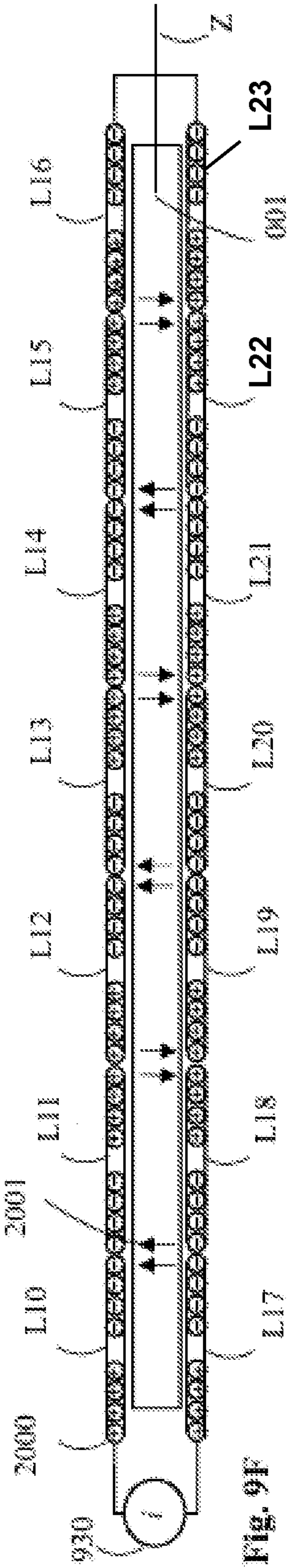
FIGS. 9F-9H depict an exemplary embodiment of a final magnetization step, in which an elongated permanent magnet having a straight geometry (i.e., linear longitudinal tube axis) is subjected to one or more final magnetization magnetic fields which produce a resulting magnetic field of continuously changing direction relative to the longitudinal axis Z. In embodiments, the final magnetization magnetic fields may be further characterized as being produced by one or more pulsed fields having predefined characteristics as depicted in FIGS. 9F and 9G. The resulting magnetic field of permanent magnet 001 may be continuous, i.e. without discontinuities, as depicted in FIG. 9H.
Figure 9G:
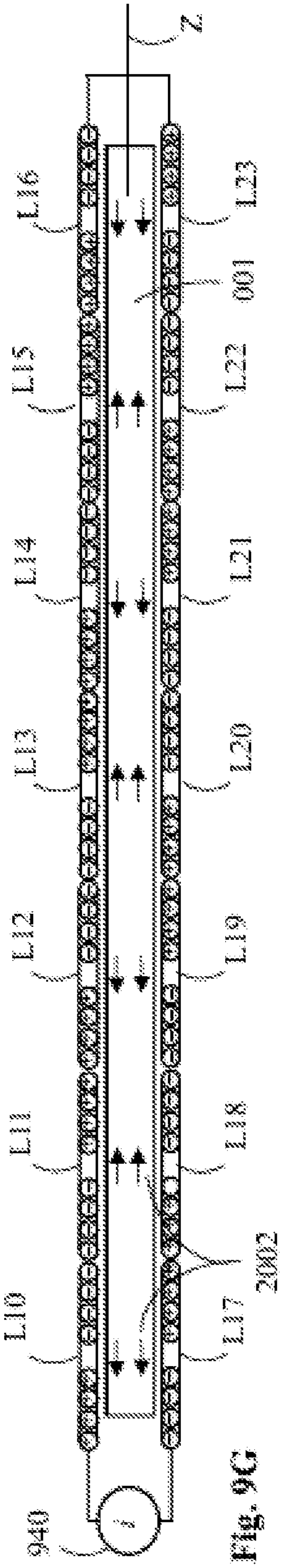

Referring now to FIGS. 9F and 9G, a final magnetization scheme for producing a straight permanent magnet having a continuously varying magnetic field direction is depicted. A series of coils L10, L11, L12, L13, L14, L15, and L16 are disposed along one side of permanent magnet to be magnetized 001. Corresponding opposing coils, placed in opposing positions to the first series of coils L 17, L 18, L 19, L 20, L 21, L 22 and L 23 are disposed along an opposing side of permanent magnet to be magnetized 001, forming opposing coil pairs L10/L17, L11/L18, L12/L19, L13/L20, L14/L21, L15/L22, L16/L23. The coils are wired in series and are connected to current source 930, which energizes the coils. The coils are shown in cross-section with the conductors indicating "+" for current direction coming out of the figure, and indicating "−" for current direction into the figure. Thus, it can be seen that electric current provided to coil L10 by current source 930 is rotating out of the figure on its left-hand side, and current is directed into the figure on its right-hand side. The magnetizing coils are connected in series so as to achieve the current directions indicated by the "+" and "−" indicators in each conductor 2000. When current source 930 is energized, a magnetic field depicted by magnetic field lines 2001 are generated between the coil pairs. Because elongate permanent magnet 001 is located between the coil pairs as shown in the figure, it is subjected to the magnetic field direction indicated by arrows 2001 when current source 930 is energized. Thus, if current source 930 is pulsed with a first high current pulse, permanent magnet 001 is subjected to the magnetic field indicated by the arrows in FIG. 9F.

Referring to FIG. 9G, it can be seen that the coil connections for magnetizing coils L17, L18, L19, L20, L21, L22 and L23 have been changed to reverse current flow in these coils when applying a second, or final, magnetization pulse. These coils are still wired in series as discussed in connection with FIG. 9F, but the connection between coils L17, L18, L19, L20, L21, L22 and L23 have been changed so that the current flow for the second final magnetizing pulse in these coils is opposite as in the first magnetizing pulse in the configuration depicted in FIG. 9F. This change in current direction in these magnetizing coils causes direction of magnetic field to change as indicated by the arrows 2002 in FIG. 9G.

Figure 9H:
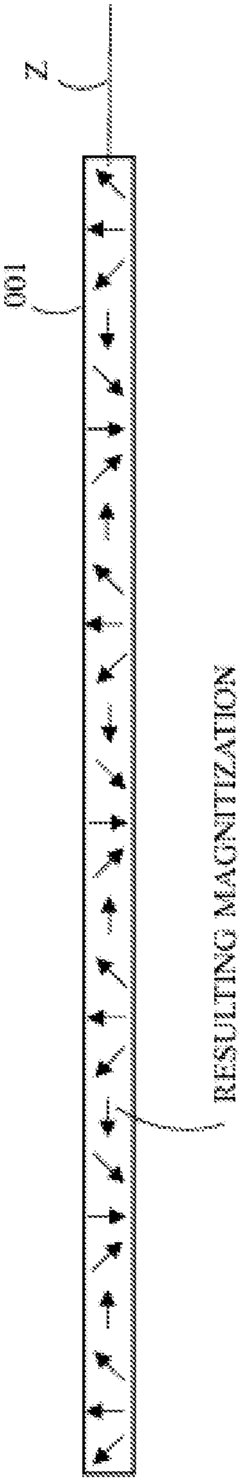

Referring to FIGS. 9F, 9G and 9H, an elongate permanent magnet having a continuously varying magnetic field direction is produced by final magnetization of the magnet when a first magnetizing pulse is produced by the coil configuration of FIG. 9F, followed by a second magnetizing pulse produced by the coil configuration of FIG. 9G. In this instance, a resulting magnetic field having field direction as depicted in FIG. 9H is produced between the magnetizing coil pairs. The elongate permanent magnet 001 is subjected to this continuously varying resulting magnetic field, resulting in an elongate permanent magnet that is permanently magnetized with the field direction as shown in FIG. 9H. Elongate, or longitudinal axis, Z is shown for reference in FIGS. 9F, 9G and 9H. As is the case with any of the magnetization schemes described herein, the peak electrical current, electrical current pulse width, and magnetizing magnet configuration (size, orientation, number of turns) are selected to produce a desired magnetizing field strength and direction applied to the magnet being magnetized.

Figure 10A:
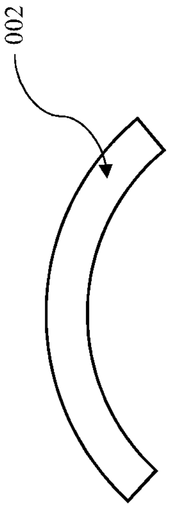
FIGS. 10A-10C depicts an exemplary embodiments of permanent magnets produced by the system and method the invention in the a final lengthwise forming step, in which an elongated permanent magnet is subjected to one or more mechanical forming operations, such, as, for example, roll forming, to produce a final mechanical form of elongated permanent magnet. The final form (for example, and not by way of limitation, curvilinear shape as shown in FIG. 10A, ring shape as shown in FIG. 10B, and coil shape as shown in FIG. 10C) may be defined by the specific application for which the elongated permanent magnet is intended.
Figure 10B:
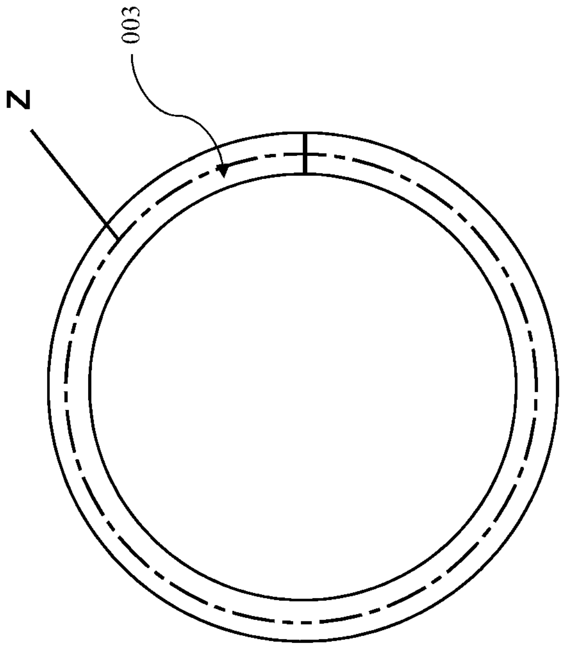
Figure 10C:
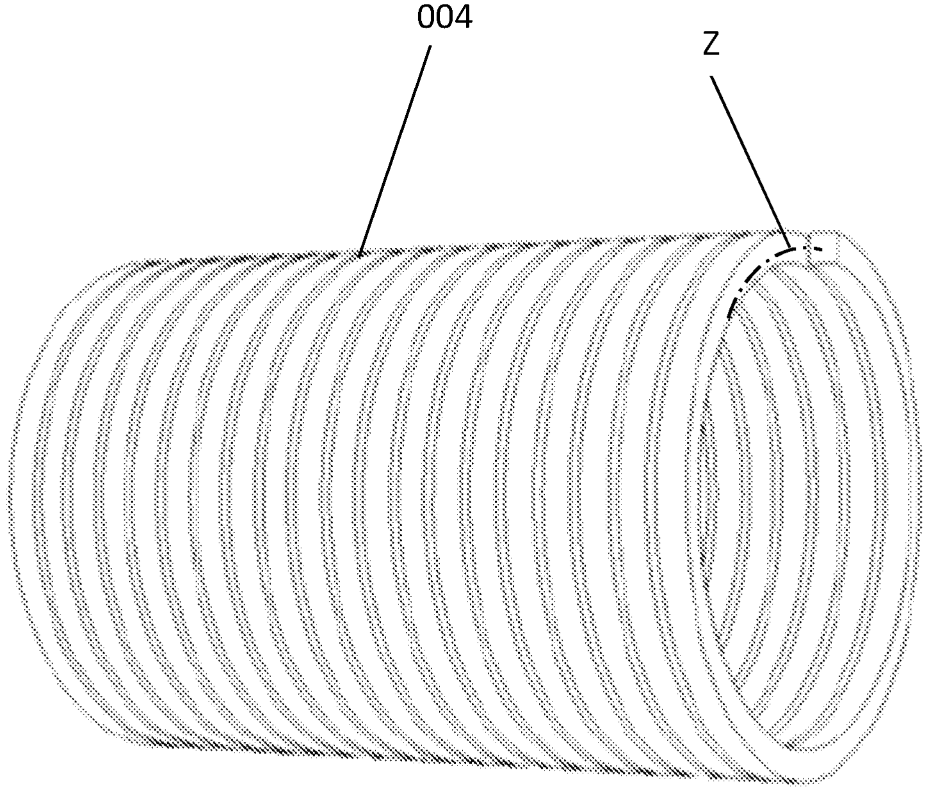

Referring now to FIGS. 10A, 10B and 10C, Exemplary embodiments of lengthwise geometries, or form factors, for various magnets which may be formed by the method and system of the invention are depicted. A curvilinear, arcuate, elongate magnet 002 having an elongate axis Z is depicted in FIG. 10A. For this arcuate shape, the tube is formed into an arcuate lengthwise shape, forming a portion of an arc, having a radius (see also FIG. 11A) A ring-shaped permanent magnet 003 having a circular elongate axis Z depicted in FIG. 10B. For this ring-shaped embodiment, the ring ends may close back upon themselves. A coil shaped permanent magnet 004 having a helical coil shaped elongate axis Z is depicted in FIG. 10C. These are just some of the exemplary embodiments of lengthwise geometries and shapes that are able to be produced by the system and method of the invention.

Figure 11A:
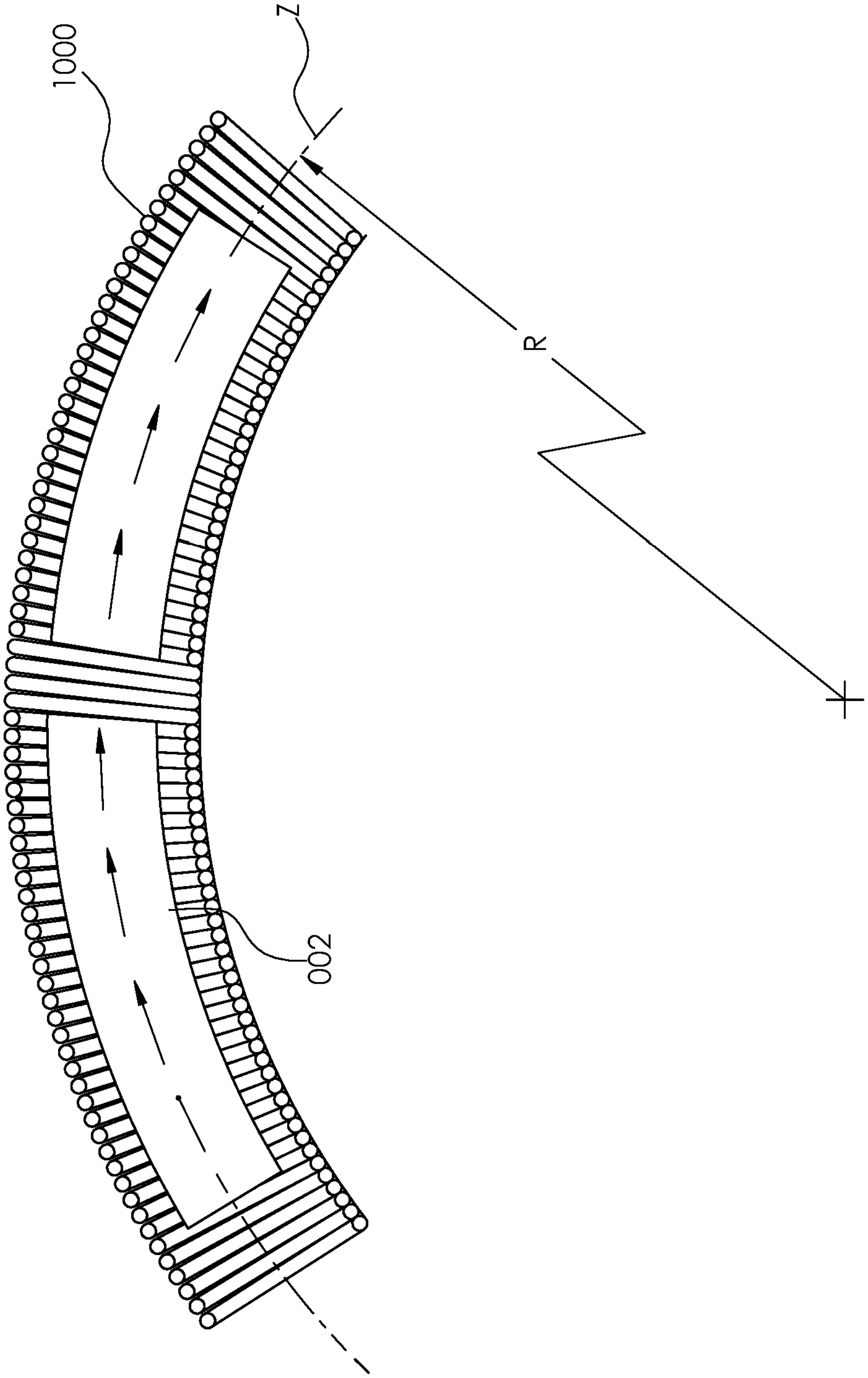
FIG. 11A depicts an exemplary of a final magnetizing step for a curvilinear or arcuate shaped permanent magnet having a final magnetic field characteristic in which the magnetic field direction is aligned with, i.e. runs along, the tube axis.
Figure 11B:
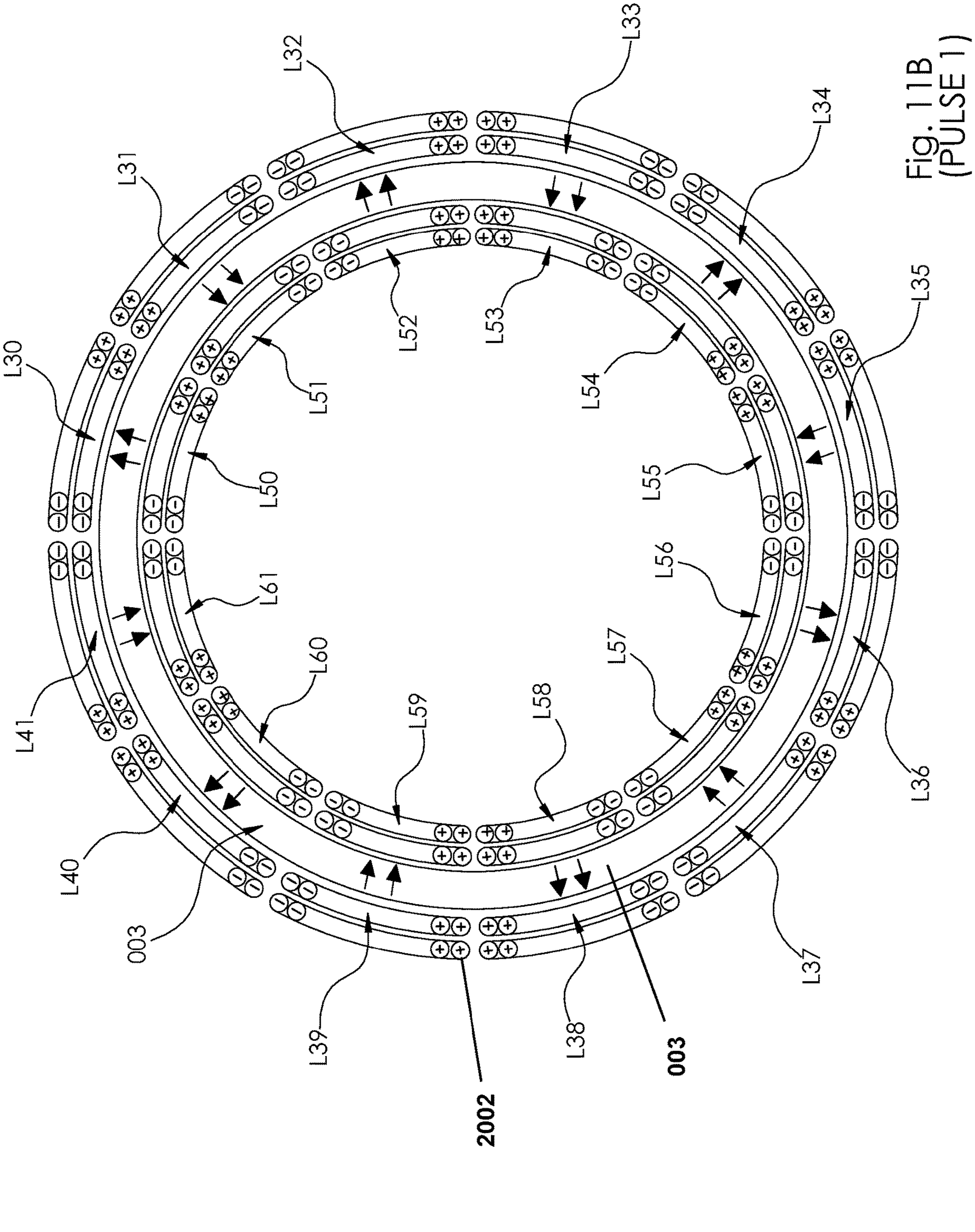
FIGS. 11B-11D depict an exemplary of a final magnetizing step for a ring-shaped permanent magnet having a final magnetic field characteristic in which the magnetic field direction is continuously changing direction with respect to the tube axis.
Figure 11C:
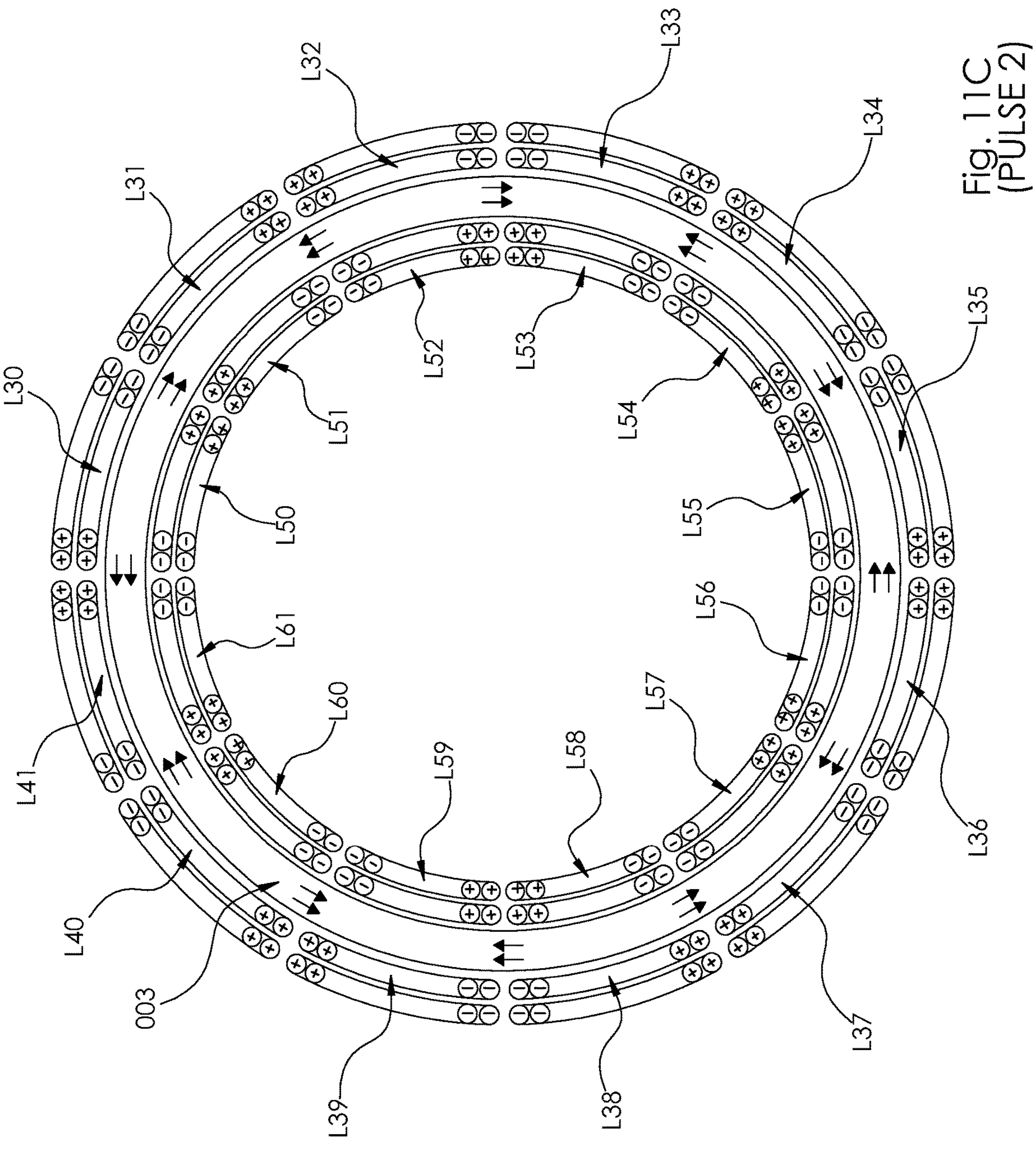

Referring now to FIG. 11A, an exemplary embodiment of a magnetization scheme for a curvilinear permanent magnet having an elongate axis Z of radius R. Curved magnetizing solenoid 1000 is provided and connected to an electrical current source (not shown). Curvilinear magnet 002 is placed within magnetizing solenoid 1000 so as to be subjected to the axial magnetic field produced by magnetizing solenoid 1000 when it is energized by the electrical current source. When magnetizing solenoid 1000 is energized by receiving current from the electrical current source, and axially directed field distribution as depicted by the arrows of FIG. 11A is created within the solenoid interior space, and therefore curvilinear (arcuate) permanent magnet 002 is subjected to this magnetic field. Curvilinear permanent magnet 002 will continue to exhibit the same magnetic field direction when the coil is deenergized and, thus curvilinear permanent magnet 002 has been finally axially magnetized by the scheme depicted in FIG. 11A, using an energized curved magnetizing solenoid to produce a desired magnetizing field.

Figure 11D:
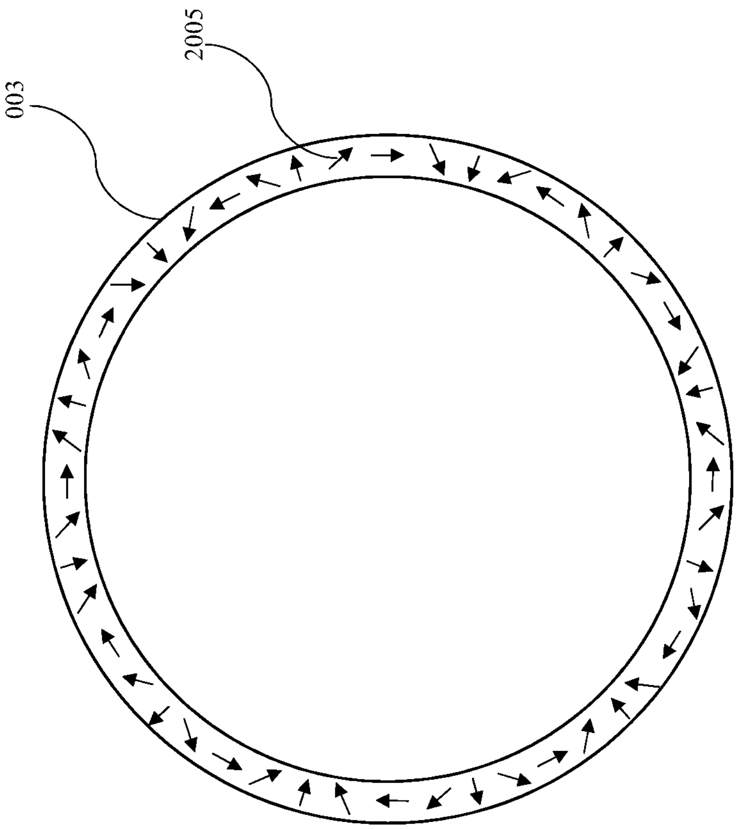

Referring now to FIGS. 11B, 11C and 11D, a scheme for providing continuously varying, for example size slightly varying, magnetization to a ring-shaped permanent magnet produced by the system and method of the invention is depicted. Two sets of opposing coils are arranged in circular fashion so as to create a magnetic field between coil pairs. In the space between coil pairs, ring shaped permanent magnet 003 is placed so as to be subjected to the magnetic field generated when opposing coil pairs are energized. An outer set of series connected coil pairs comprises coils L30, L31, L32, L33, L34, L35, L36, L37, L38, L39, L40 and L41. An inner of series connected coil pairs comprises coils L50, L51, L52, L53, L54, L55, L56, L57, L58, L59, L60 and L61. The outer set of coils and inner of coils form coil pairs L30/L50, L31/L51, L32/L52, L33/L53, L34/L54, L35/L55, L36/L56, L37/L57, L38/L58, L39/L59, L40/L60, and L41/L61.

Referring now to FIG. 11B, the coils are wired in series and are connected to a current source which energizes the coils. The coils are shown in cross-section with the conductors indicating "+" for current direction coming out of the figure, and indicating "−" for current direction into the figure. Thus, it can be seen that electric current provided to coil L30 by the current source is rotating into the figure on its left-hand side, and current is directed out of the figure on its right-hand side. The magnetizing coils are connected in series so as to achieve the current directions indicated by the "+" and "−" indicators in each conductor 2002. When the current source is energized, a magnetic field depicted by magnetic field lines 2003 are generated between the coil pairs. Because ring-shaped permanent magnet 003 is located between the coil pairs as shown in the figure, it is subjected to the magnetic field direction indicated by arrows 2003 when the current source is energized. Thus, if current source is pulsed with a high current pulse, permanent magnet 003 is subjected to the magnetic field indicated by the arrows in FIG. 11B.

Referring now to FIG. 11C, it can be seen that the coil connections for outer magnetizing coils L30, L31, L32, L33, L34, L35, L36, L37, L38, L39, L40 and L41 have been changed to reverse current flow in these coils when applying the final magnetization pulse. These coils are still wired in series (as similarly discussed in connection with FIG. 9G), but the connection between coils L30, L31, L32, L33, L34, L35, L36, L37, L38, L39, L40 and L41 have been changed so that the current flow for the second final magnetizing pulse in these coils is opposite as in the first magnetizing pulse in the configuration depicted in FIG. 11B. This change in current direction in these magnetizing coils causes direction of magnetic field to change as indicated by the arrows in FIG. 11C.

Referring now to FIGS. 11B, 11C and 11D, an ring-shaped permanent magnet 003 having a continuously varying magnetic field direction is produced by final magnetization of the magnet when a first magnetizing pulse is produced by the coil configuration of FIG. 11B, followed by a second magnetizing pulse produced by the coil configuration of FIG. 11C. In this instance, a resulting magnetic field having field direction as depicted by the arrows 2005 in FIG. 11D is produced between the magnetizing coil pairs. The ring-shaped permanent magnet 003 is subjected to this continuously varying resulting magnetic field, resulting in a ring-shaped permanent magnet that is permanently magnetized with the field direction as shown in FIG. 11D.

In any of the embodiments of the method of the invention, the wall thickness WT of the tube may be further reduced by machining, grinding, milling or any other mechanical operation in order to achieve a desired wall thickness or cross-sectional dimension of the tube.

In any of the embodiments of the method of the invention, a sintering step may precede the final magnetization step.

The direction of magnetization for pre-alignment and final magnetization is precisely controlled. This improves the yield and performance of the final magnet product. The direction of magnetization can be uniform or non-uniform including varying the direction along the length of the magnet. This includes straight, ring, coil and other geometries.

In any of the embodiments of the invention, the magnetic powder material is handled in an environment that has been purged of oxygen. This may be done by enclosing the system and apparatus for any step of the invention that involves the magnetic powder material, such as the tube filling steps and all steps prior to the sealing of the tube, in an enclosure (or housing or other structure) that has been purged of oxygen. For example, the systems and apparatus' depicted in FIGS. 5 and 6 may be fully enclosed in a chamber, enclosure or housing that has been purged of oxygen by pressurizing the chamber with dry nitrogen gas, as is known in the art.

Applications and Use Cases

The following applications and use cases of permanent magnets produced by the method and system of the invention are described below. These cases are provided as exemplary cases of numerous applications and use cases in which permanent magnets produced by the novel method and system of the invention improve upon the state of the art.

One example application of an application of the permanent magnets produced by the system and method of the invention is in production of rotors for electrical machines (including both motors and generators). Electrical machines are configured with a rotor and a stator/armature.

In electrical machines, permanent magnets are used for the rotor magnetic excitation. The performance of an electrical machine is highly dependent on the magnetic coupling between the rotor and stator. For optimum performance, the remanent flux density in the permanent magnet should be directed towards the gap between the machine's rotor and stator. The higher the magnetic field the better the performance.

Permanent magnet rotors are generally configured in a segmented, North-South Pole configuration (35) to produce a (close to) sinusoidal field (radial component). In this configuration, the usable magnetic field (the magnitude of the radial field fundamental) between the rotor and stator is significantly reduced since the field direction is both outward and inward off the magnet assembly. Therefore, it is common practice to add iron/steel to both enhance and re-direct the rotors magnetic flux field towards the stator. An example magnetic field distribution of a North-South pole electrical machine rotor (42) is shown in FIG. 12.

An alternative electrical machine configuration uses Halbach arrays for the machine rotor. A Halbach array is a special arrangement of magnets having different magnetization directions in each magnet segment, each segment having a magnetization direction rotated with respect to its neighbor so that the magnetization direction is periodic with respect to 2 magnetic poles of the magnet assembly (36). This configuration directs the magnetic field lines so that the field is augmented on one side of the array. Such a configuration channels most of the magnetic flux in one direction, forming magnetic poles with a close to perfect sinusoidal distribution. This directs the magnetic flux field towards the direction of most interest. For an electrical machine it is the gap between the rotor and stator. For magnetic gearboxes it is between each "gear" ring. For MRI it is towards the imaging region.

Halbach arrays for electrical machines may include a single-rotor (37) or dual-rotor configuration (38). For a dual-rotor machine, an outer (39) and inner (40) Halbach array are positioned around the machine's stator (34). Halbach array configured electrical machines have performance improvements typically greater than 10% for a single-rotor and greater than 30% improvement for a dual-rotor electrical machine. Furthermore, a dual-rotor electrical machine eliminates the need for steel/iron and eliminates magnetic drag during free wheeling. This results in machines having lower mass and smaller size. This is of great interest for high power density machines which are needed for electric propulsion.

Halbach arrays are rarely used due to the prohibitive cost to manufacture the magnets and the complexity to assemble into a product.

The system and method for producing permanent magnets of the invention enables the production of elongate straight, ring, coil and other permanent magnet lengthwise geometries. For electrical machines, including linear motors, the "wire-like" (i.e., elongate) permanent magnet configurations achievable using the system and method for producing permanent magnets of the invention can replace segmented permanent magnet rotors with a single permanent magnet. The method also enables the magnets to be magnetized with a continuously changing flux distribution. The manufacturing method of the invention is operable to run at a high rate, independent of cross-section or final geometry of the permanent magnet. The continuously changing flux magnetization of permanent magnets that may be produced by the system and method of the invention are superior to a traditional Halbach array because the Halbach array uses a plurality of discrete permanent magnets, each sequential magnet being of uniform magnetization and having opposite polarity to the magnets on either side. This leads to discontinuities and space harmonics in the flux distribution and some leakage flux. However, using the method and system of the invention, a single ring-shaped permanent magnet with a continuous sinusoidal flux distribution is produced in which there are no discreet magnet segments assemblies which result in the discontinuities and space harmonics suffered by traditional Halbach arrays.

A dual-rotor motor comprising a permanent magnet having a continuously changing magnetization, as produced by the method and system of the invention, is shown in FIG. 13. These single-magnet configurations, produced by the method and system of the invention, provide higher power density, higher specific torque (motors) and lower cost than is achievable with traditional discrete-magnet Halbach arrays.

The method for non-uniform and continuously changing magnetization is unique and optimized for each end-use product. An electromagnet which is either pulsed (AC) or continuous (DC) superconducting provides a unique magnetizing field distribution that when applied to the permanent magnet provides the final magnetic flux distribution. The pre-alignment magnetization (20) uses a magnetic field lower than the final magnetization (~1.5 8 Tesla) which occurs at various stages including between forming stages (18). Final magnetization uses a high magnetic field (4-6 Tesla).

What is claimed is:

1. A method for producing a permanent magnet, comprising:

providing a tube having an interior volume, a length, a first end, and a second end;

providing an anisotropic magnetic powder;

filling the interior volume of the tube with the anisotropic magnetic powder while subjecting the anisotropic magnetic powder to a pre-aligning magnetic field while the anisotropic magnetic powder is being poured into the tube;

subjecting the exterior surfaces of the tube to compressive forces, reducing the cross-sectional size of the tube, and compressing the magnetic material within the tube; and subjecting the tube and magnetic material within the tube to at least one final magnetizing magnetic field.

2. The method of claim 1, wherein the anisotropic magnetic powder is further defined as selected from the group consisting of neodymium iron boron (NdFeB), samarium cobalt (SMC0), Alnico, and ferrite powder.

3. The method of claim 1, wherein the tube comprises a non-magnetic material.

4. The method of claim 1, wherein the pre-aligning magnetic field is further defined as a uniform transverse magnetic field.

5. The method of claim 1, wherein the pre-aligning magnetic field is further defined as an axially aligned magnetic field, in which the magnetic field direction runs along an axis of the tube.

6. The method of claim 1, wherein the pre-aligning magnetic field is further defined as a continually varying magnetic field, in which the magnetic field continually varies along an axis of the tube.

7. The method of claim 1, wherein said at least one final magnetizing magnetic field is further defined as two pulsed magnetic fields.

8. The method of claim 7, wherein the two pulsed magnetic fields produce a desired resulting magnetic field, producing a desired magnetization of the permanent magnet.

9. The method of claim 1, wherein the at least one final magnetizing magnetic field is further defined as having a direction axially aligned with an axis of the tube.

10. The method of claim 1, wherein the at least one final magnetizing magnetic field is further defined as having a direction that is transversely oriented with an axis of the tube.

11. The method of claim 1 in which the tube is linear along its axis.

12. The method of claim 1 in which the tube is formed into a ring shape that closes back upon itself.

13. The method of claim 1 in which the tube is formed into a helical coil shape.

14. The method of claim 1 in which the tube is formed into an arcuate lengthwise shape, forming a portion of an arc, having a radius.

15. The method of claim 1, wherein the anisotropic magnetic powder is further defined as selected from the group consisting of neodymium iron boron (NdFeB), samarium cobalt (SMC0), Alnico, and ferrite powder.

16. The method of claim 1, further comprising the steps of:

- compressing and forming, on a continuous basis, the elongated permanent magnet into a final desired cross-sectional shape;
- forming the elongated permanent magnet into a desired final lengthwise shape having a length, a first end, and a second end; and
- magnetizing, in a final magnetization step, the elongated permanent magnet, using at least one second applied magnetic field, to achieve a final desired magnetization of the elongated permanent magnet.

17. The method of claim 4, wherein the magnetic powder is further defined as selected from the group consisting of neodymium iron boron (NdFeB), samarium cobalt (SMC0), Alnico, and ferrite powder.

18. The method of claim 4, wherein the step of compressing further comprises swaging or pressure rolling the elongated permanent magnet.

19. The method of claim 4, wherein said step compressing is further defined as continuing until the magnetic powder is characterized by a desired compaction density.

20. The method of claim 4, wherein the step of compressing further comprises drawing the elongated permanent magnet such that the thickness of the closed tube wall is reduced.

21. The method of claim 4, wherein the step of pre-aligning is further defined as aligning the field direction of the elongated permanent magnet such that it produces a desired uniform magnetization direction of the permanent magnet.

22. The method of claim 4, wherein the step of pre-aligning is further defined as aligning the field direction of the elongated permanent magnet such that it produces a desired non-uniform magnetization direction of the permanent magnet.

23. The method of claim 4, wherein the step of pre-aligning is further defined as aligning the field direction of the elongated permanent magnet such that it produces a desired a continuously changing flux magnetization direction of the elongated permanent magnet.

24. The method of claim 4, wherein the step of magnetizing the elongated permanent magnet is carried out using a pulsed current electromagnet or a constant current electromagnet.

25. The method of claim 4, further comprising the step of cutting the elongated permanent magnet to a desired length.

26. The method of claim 4, wherein the step of forming the elongated permanent magnet into a desired final lengthwise shape is further defined as forming the elongated permanent magnet into a ring shape using a ring-roll forming process.

27. The method of claim 4, wherein the step of forming the elongated permanent magnet into a desired final lengthwise shape is further defined as forming the elongated permanent magnet into a coil shape using a ring-roll forming process.

28. The method of claim 4, wherein the step of forming the elongated permanent magnet into a desired final lengthwise shape is further defined as forming the elongated permanent magnet into an arbitrary shape using a ring-roll forming process.

29. The method of claim 4, wherein the final magnetization step is further defined as magnetizing the field direction of the elongated permanent magnet such that it produces a uniform magnetization of the elongated permanent magnet.

30. The method of claim 4, wherein the final magnetization step is further defined as magnetizing the field direction of the elongated permanent magnet such that it produces a non-uniform magnetization of the elongated permanent magnet.

31. The method of claim 4, wherein the final magnetization step is further defined as magnetizing the field direction of the elongated permanent magnet such that it produces a continuously changing flux magnetization direction of the elongated permanent magnet.

32. The method of claim 4, wherein the final magnetization step is further defined as a two-step process, wherein the elongated permanent magnet is subjected to a magnetic field generated by a first magnetizing coil that is pulsed with a first electric current in a first direction, followed by a second magnetizing coil being pulsed with a second magnetizing electric current in a second direction.

33. The method of claim 4, wherein the elongated permanent magnet first and second ends are sealed by a method selected from the group consisting of applying epoxy, attaching an end cap using welding, and attaching an end cap using chemical bonding.

34. The magnet of claim 20, wherein the magnetic powder is further defined as selected from the group consisting of neodymium iron born NdFeB), samarium cobalt (SMC0), Alnico, and ferrite powder.

35. The magnet of claim 20, wherein the magnetic powder is characterized as having been compressed to achieve a desired compaction density.

36. The magnet of claim 20, wherein said pre-aligning is further defined as aligning the field direction of the elongated permanent magnet such that it produces a desired uniform magnetization direction of the permanent magnet.

37. The magnet of claim 20, wherein the said magnetizing the elongated permanent magnet is carried out using a pulsed current electromagnet or a constant current electromagnet.

38. The magnet of claim 20, wherein said forming the elongated permanent magnet into a desired final lengthwise shape is further defined as forming the elongated permanent magnet into a ring shape using a ring-roll forming process.

39. The method of claim 4, wherein the step of forming the elongated permanent magnet into a desired final lengthwise shape is further defined as forming the elongated permanent magnet into a coil shape using a ring-roll forming process.

40. The magnet of claim 20, wherein said final magnetization is further defined as a two-step process, wherein the elongated permanent magnet is subjected to a magnetic field generated by a first magnetizing coil that is pulsed with a first electric current in a first direction, followed by a second magnetizing coil being pulsed with a second magnetizing electric current in a second direction.

* * * * *